United States Patent
Alvarenga

(10) Patent No.: US 12,448,187 B2
(45) Date of Patent: Oct. 21, 2025

(54) CUSTOMIZABLE FOOD SERVICE CONTAINERS WITH TRACKABLE AND E-COMMERCE FUNCTIONALITY

(71) Applicant: Durandarte LLC, St. Petersberg, FL (US)

(72) Inventor: Jose Benedicto Roldan Alvarenga, St. Petersberg, FL (US)

( * ) Notice: Subject to any disclaimer, the term of this patent is extended or adjusted under 35 U.S.C. 154(b) by 163 days.

(21) Appl. No.: 18/240,292

(22) Filed: Aug. 30, 2023

(65) Prior Publication Data

US 2025/0074670 A1    Mar. 6, 2025

(51) Int. Cl.
*B65D 51/24* (2006.01)
*B65D 51/26* (2006.01)
*B65D 51/32* (2006.01)

(52) U.S. Cl.
CPC ........... *B65D 51/245* (2013.01); *B65D 51/26* (2013.01); *B65D 51/32* (2013.01); *B65D 2203/10* (2013.01)

(58) Field of Classification Search
CPC ...... B65D 51/245; B65D 51/26; B65D 51/32; B65D 2203/10
See application file for complete search history.

(56) References Cited

U.S. PATENT DOCUMENTS

| | | | |
|---|---|---|---|
| 10,631,413 B1* | 4/2020 | Chao | H05K 1/0203 |
| 2010/0025267 A1* | 2/2010 | Brand | A47G 19/2227 221/92 |
| 2012/0298676 A1* | 11/2012 | Cooks | B65D 81/3216 220/592.21 |
| 2019/0032687 A1* | 1/2019 | Wakeham | A47G 19/2205 |
| 2020/0207515 A1* | 7/2020 | Fish | B65D 25/08 |
| 2021/0081909 A1* | 3/2021 | Wittek | G06K 7/10297 |
| 2022/0139146 A1* | 5/2022 | Wallis | G07F 7/069 194/205 |
| 2023/0196306 A1* | 6/2023 | Saltzman | G06Q 10/30 705/308 |
| 2024/0246750 A1* | 7/2024 | Trivelli | B65D 85/8052 |

* cited by examiner

*Primary Examiner* — An T Nguyen
(74) *Attorney, Agent, or Firm* — Christopher J Vandam P.A.; Chris Van Dam

(57) ABSTRACT

A modular tumbler, vessel and plates made with a durable material that includes a NFC and a Bluetooth™ Low Energy (BLE) Beacon for commercial trade and item location purposes. The invention includes a modular tumbler, vessel and plate holder with accessories that will avoid usage of disposals items. The volume and size of the tumblers, vessel & plate can change according to market needs, lids and tumblers holders includes modular features as well to be able to fit the different accessories. The present invention include multiple modular features and accessories and allow tumblers, vessels and plates to be merge with Internet of things solutions by using the NFC & BLE chips to exchange data with Smart devices like Tablets, smart phones, computers, others.

19 Claims, 31 Drawing Sheets

CUSTOMIZABLE FOOD SERVICE CONTAINERS WITH TRACKABLE AND E-COMMERCE FUNCTIONALITY

REFERENCE TO RELATED PATENTS OR APPLICATIONS

None.

FIELD OF THE INVENTION

The present solution relates to the design of tumblers, vessels and plates that merge the design with digital solutions (Mobil apps, web applications, and tracking system) by adding chip with specific functions like NFC & Bluetooth™ Low Energy (BLE). This will allow users to personalize their tumblers, vessels and plates to help user to have culture to avoid use of disposals and with our invention we'll allow fast food consumers to contribute to stop used of plastic and cardboard tumblers, vessels and plates to prevent climate change. The capability to sync device with digital solution will help different food franchise areas to save cost by allowing users to make trades with their products and owners will be able to have new type of experience with the product with the interaction of mobile apps and tracking system to generate a culture of bring your own tumblers, vessels, bucket and plates as consumer and in benefit of environment.

Novel process to generate rewards based on the use of the items described on this invention to promote usage of reusable products. The process includes a track products based on BLE chip capabilities and be able to use them on trading transaction by using the NFC chip with a unique identifier. Also included on this process is the data analysis to food franchises to track benefits to their cost savings and support a change on the current climate change scenario, all this will be presented using Mobile applications, web services and is not limited to new digital solutions and technologies that could be merged on the process and product on the search for the same goal.

BACKGROUND OF THE INVENTION

The present invention relates to food related service articles for serving and delivering food, and more specifically to such devices with integral tracking and locating means and methods of use.

There are in the market different set of tumblers, vessels, buckets and plates that have multipurpose solutions (modules) and volumes. Those solutions are following a unique purpose to provide different intake solution and attractive features to the consumers, like: tumblers covered with magnets, sport tumblers covers, tea infusion filters, among others. The goal of the products are mainly to the proper drinkware solutions and food intake. None uniquely identify and track a particular individual article.

Prior art includes tumblers or other vessels that could include NFC chips to track temperature or specific functions. In addition to this, current tumblers, vessels, buckets and plates are lacking of a practical and modular holder that could promote user to keep them with them at any time to prevent the use of disposable tumblers, vessels and plates. Current solutions are lacking in providing a real solution to fast food franchisers and others to be able to participate directly in the solution to avoid disposal items in its branches and for delivery services. No prior art provides for a customer to have uniquely identified food service items that can then be reused by the same customer and tracked by the foodservice establishment.

Other patents describing the closest subject matter provide for a number of more or less complicated features that fail to solve the problem in an efficient and economical way. None of these patents suggest the novel features of the present invention.

A brief abstract of the technical disclosure in the specification and title are provided as well for the purposes of complying with 37 CFR 1.72 and are not intended to be used for interpreting or limiting the scope of the claims.

Without limiting the scope of the invention, a brief summary of some of the claimed embodiments of the invention is set forth below. Additional details of the summarized embodiments of the invention and/or additional embodiments of the invention may be found in the detailed description of the invention below.

OBJECT OF THE INVENTION

A novel design of tumblers, vessels and plates to integrate attractive features embedded and merge into digital solutions to wake up a new type of interest on the advantage to use reusable tumblers, lids, vessels and plates by margining technology and new marketing models for customers, food franchises and companies that will want products in the aim to reduce internal costs, restore and preserve the nature environment and help to revert climate changes.

By adding NFC & BLE chips and be able to integrate product with digital solutions like Mobil apps, there will be multiple applications/solutions to be used by product owners and food franchises and companies that required to reduce disposal of used products. There may be means to create the associated software application that facilitates a new type of trade and interactions between product and food franchise owners to promote the use of this proposed reusable tumblers, vessels, buckets and plates. By including BLE, this give the capacity to keep your product always with you and locate/track it on a closed area or use mobile apps to locate it by using GPS features on smart products. There is a capability to add more features on the circuit board like temperature sensor, accelerometer among others.

A novel process is also included to merge products meant to avoid usage of disposals with a new rewards process and method to interact using a smartphone application and web services. Adding a smartphone application to mix multiple products under platform management will grant product's owners the capabilities to avoid lost them and increase ties to use the items in benefits of the environment. The process is not limited to add new features or new application related with rewards strategy, the franchises will be able to manage their inner strategy to save cost and promote product usage and for the users, application will provide a way to review customize settings to promote the acquisition of new modules for their products and acquire them using a e-commerce environment.

DESCRIPTION

The present invention is a new design for modular tumblers, lids, vessels, buckets, plates and holder for reusable products by including multipurpose features. NFC & Bluetooth™ Low energy (BLE) chips mounted on an electronic board to integrate them with the "Internet of thing" by using different digital solution. The NFC and BLE chips will provide unique capabilities like universal code to special trade purposes, temperature metric and help to locate the tumbler/vessels/plates under a specific range a near location and/or using GPS features from mobile devices.

The tumblers, vessels, bucket and plates will include a section on the design that will protect NFC/BLE chip with ingress protection standards (IP) and will provide shock resistance. The exchangeable top nozzle piece for tumblers & vessels will have a standard mounting/screw system that will easily replace items to the one that suit the needs. The tumblers, vessels, buckets, plates, holders & lids will have magnetic components that will allow the user to have special holders to have an easy process to carry the products with them at all places.

The tumblers and vessels will have modular holders with a primary holder that can use isolated with and ribbon, or by combining one or two primary holder with a secondary modular holder to create a cup holder. In addition, primary holder will have different types with one piece or segmented in two pieces, cup holders can include an internal storage area to include a sectional straw to be assembled, this create a unified product to avoid using disposal straws. In addition, the exchangeable pieces included into modular design will allow fast food franchises to create new incomes and rewards by including their brands on the aim to keep using this new modular design.

Delivery services are part of the big consumers of disposals and, currently, there is a lack of processes or solution to avoid that this type of products flood the market, with present invention there are an initial set of items that follow the same pattern with NFC & BLE chips to provide a new method for food service product's exchange process between modular buckets and plates with special delivery buckets and boxes.

The invention includes a set of processes that are able to be implemented with the usage of mobile applications and web base solution to merge products with BLE & NFC chips embedded. The process included on this invention is not limited to have new features, functionality methods, program code. The first digital solution that merge product includes a mobile application where you can register your products and track usage in benefits of environment. The application may include a rewards method where different food franchises and companies can add special incentives to win/add franchises' points and have a different type of point by using the products. The application may also include features to locate and track device, customize and have environmental benefits dashboard for the company and product's owner. A web base solution may be included on the process to franchises be able to admin their rewards strategy and track company benefits by the usage our invention products and process. The benefits for the companies can be measure by cost saving, new markets opportunities, company reputation and all their benefits are tied with environment benefits and looking for a more technological era.

The terminology used herein is for the purpose of describing embodiments only and is not intended to be limiting of the invention. As used herein, the term "and/or" includes any and all combinations of one or more of the associated listed items. As used herein, the singular forms "a", "an", and "the" are intended to include the plural forms as well and the singular forms, unless the context clearly indicated otherwise.

In one exemplary embodiment the invention is comprised of the integration of NFC and Bluetooth™ Low Energy beacon (BLE) in modular tableware made with resistant and reusable materials, this also includes compatible accessories to include own functionalities. The utensils used in a first delivery do not limit the creation of more articles for the same purpose. The elements developed are tumblers, vessels, bucket, plates as well as accessories to improve their functionality such as modular holders for safe transport, cup holders, cutlery, bucket and boxes for delivery services. The NFC chip will have a unique ID following an international standard to make a unique item for any transaction with it.

The products will optionally have an interchangeable base that will protect the integrated circuit with NFC and Bluetooth™ Low energy (BLE). This circuit will have a battery power that can be interchangeable. All this set is protected under the IP protection standard (Ingress Protection). In addition, the products will be made of a resistant and thermo-resistant material and capable of undergoing changes in temperature that can be translucent or solid. In both cases, there may be marks in their design that indicate different volume metrics for easy recognition in solid materials. The spout of the tumblers will be interchangeable to be able to use the type of spout or lid to use. To protect the integrated circuit with NFC & BLE chips from unnecessary actions, products include a special key to be able to open the secured area.

By adding NFC & BLE chips and be able to integrate product with digital solutions like smart phone apps, there will be multiple applications/solutions to be used by product owners and food franchises and companies that required to reduce disposal of the product. There may be means within the application that create a new type of trades and interactions between product and food franchise owners to promote the use of this proposed reusable tumblers, vessels and plates. By including BLE, this give the capacity to keep your product always with the product owner and locate/track it on a closed area or use mobile apps to locate it by using GPS features on smart products. There is a capability to add more features on the circuit board like a temperature sensor, accelerometer among others.

The lid may have a slide-on plug which will be integrated into the lid by means of a metal base with magnetic and rotating properties and a protruding metal integrated into the slide-on plug with magnetic properties. The lid can use the sliding straw stopper, a raised surface to close and/or open the opening for the use of straws, the opening for regular liquid intake and/or close both liquid release openings. The lid, slide-on plug and the metal base will include a central entrance to be able to install a French press plunger rod if needed and a magnetic plug to close this area while this accessory is not used. The slide-on and lid can have this special plugs to be replaceable and secure the area while French press plunger rod is not installed.

The design of the tumblers has the purpose to exchange different types of lids and there are options to convert lids on a coffee purge over module or different types of bottle's nozzles.

There may be accessories for the easy portability of the cup, these holders will be modular, having two parts: an isolated primary holder and secondary modular holder. The primary holder will hold the tumbler and/or vessels through pressure and metals with magnetic properties embedded in its base, this primary holder could be in one piece or segmented based on customer's preferences.

In the same way, the primary holder can be used through ropes and/or ties to be anchored to a similar key ring. The secondary modular holder of the unified accessory will contain a support and resistant clip to be anchored on thin and flat surfaces for easy adherence. This base will have anchoring tongs that will fit perfectly with the main holder for greater control and transport safety. In addition to this, the secondary modular holder may include a storage area to store a sectioned straw that can be assembled by unifying each of its ends.

Another modular accessory of the invention are the cup holders, which will use the main fasteners as base elements to fulfill their function, added to the anchoring tongs included in a fixed base. The fixed base on this occasion will include a handle that will function as a cup holder. As an added utility, the cup holder may come with either a single base or a multi-function base that will include a storage area for a selected straw.

The modular plate may composed of individual plates that will be anchored one after the other by means of solid anchors/clips and fixing holes to give rigidity to the unification of the dish. In addition, the individual plate may be able to convert into a cube that will allow the transport of other elements and have the function of a snack box. This box will be formed starting from two pieces stored inside two of the individual plates; a closure part and a base part, fixed and that will contain the integrated circuit with the NFC and BLE. The part with the integrated circuit will have the highest protection of the modular plate.

Each individual plate may have a special function for the creation of the unified plate and the cube. Likewise, they will have specific storage and anchoring functions. All the plates may have security holes to hold the anchors and the closing piece and integrated circuit when generating the cube. As an important optional element, there may be plates that store a greater number of anchors internally based on their function, and other individual plates will store the closing parts, another the integrated circuit part, and another a container to store your own reusable cutlery. All with the aim of reusing tableware, reducing the use of disposables and supporting the restoration of natural resources.

There are a set of products focused of delivery services based on bucket and modular plates have a little dimension variance in order to easy fit with the internal area of the bucket and plates. Their bottom area is collapsible to easy exchange product between franchise product and customer's item.

The products with BLE & NFC solutions will be able to be managed by a proprietary application that includes different features and processes and is not limited with a single application, the initial application to release includes a rewards methods application that will promote the usage of the product and generate benefits to different food franchises and products' owners.

A reward method application is merged as the initial smartphone application to promote with this invention and the usage of the products, increase customer ties with products and environmental benefits and provide food franchises the opportunity to add a new process to reduce their cost in disposals and have new revenue areas and marketing opportunities. The initial application is not limited to the opportunity to add new technologies, processes and program code to take advantage of NFC, BLE and upcoming technologies to provide a way to link technology with environment friendly solutions.

DETAILED DESCRIPTION OF THE INVENTION

Figure 1:
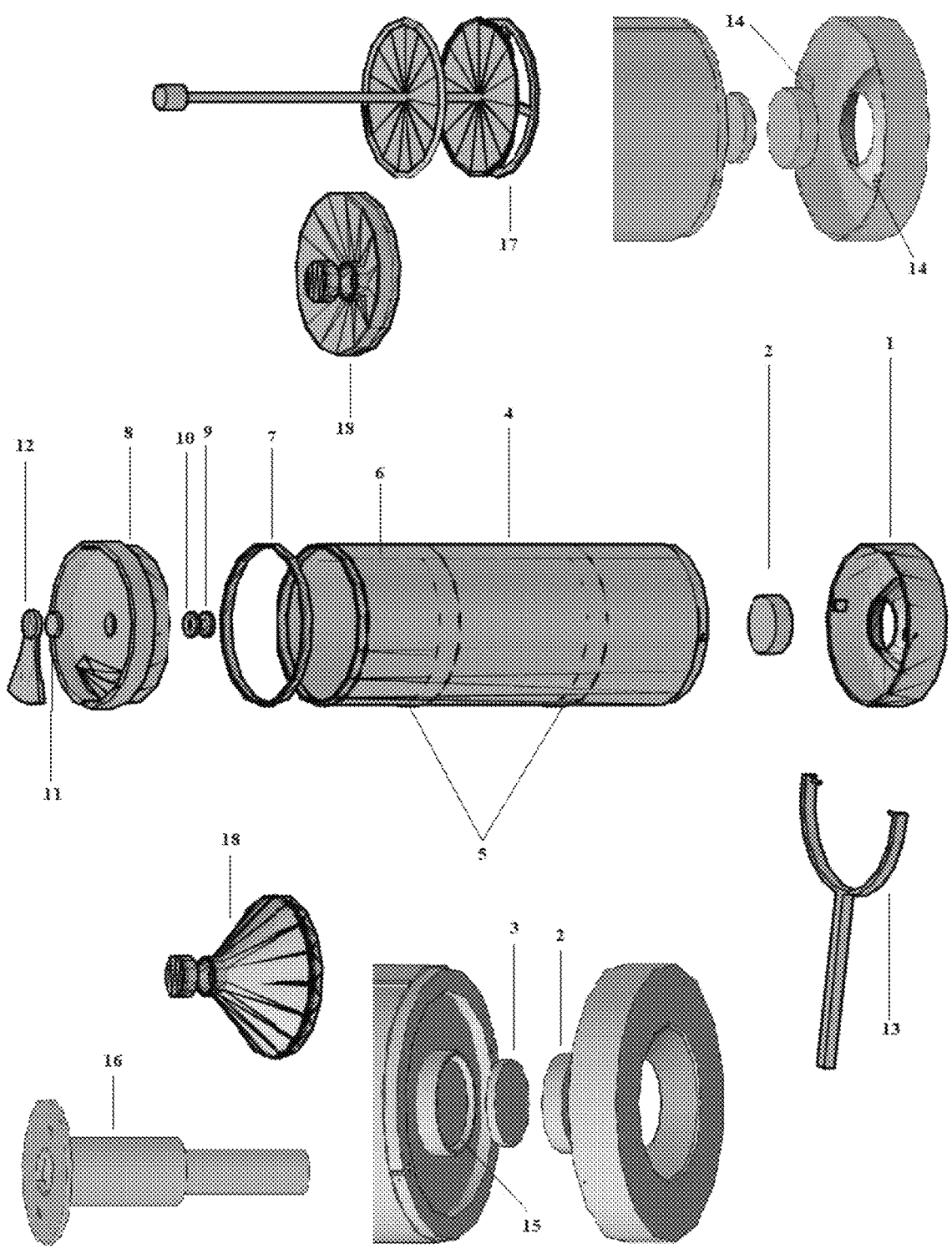
FIG. 1 is an exploded perspective view of an embodiment of the design overview of modular tumblers with the different sections and base accessories.

The terminology used herein is for the purpose of describing embodiments only and is not intended to be limiting of the invention. As used herein, the term "and/or" includes any and all combinations of one or more of the associated listed items. As used herein, the singular forms "a", "an", and "the" are intended to include the plural forms as well and the singular forms, unless the context clearly indicated otherwise.

The invention is comprised of the integration of NFC and Bluetooth™ Low Energy beacon (BLE) in modular tableware made with resistant and reusable materials, this also includes compatible accessories to include own functionalities. The utensils used in a first delivery do not limit the creation of more articles for the same purpose. The elements developed are tumblers (FIG. 1), vessels, plates (FIG. 16), as well as accessories (FIG. 8) to improve their functionality such as modular holders for safe transport (FIG. 9), cup holders (FIG. 12 to FIG. 15) and cutlery (123, 124, and 125). The NFC chip (3) will have a unique ID following an international standard to make a unique item for any transaction with it and BLE chip enable the feature to locate/track the product on a closed area or use mobile apps to locate it by using GPS features on smart products.

The tumblers design is an insulated double wall vacuum and have an interchangeable base (1) that will protect the integrated circuit with NFC and Bluetooth™ Low energy (BLE), the integrated circuit board will have a first layer of protection (2) and anti-shock attached into the base on the tumbler's body (15). This circuit will have a battery power that can be interchangeable. All this set is protected under the IP protection standard (Ingress Protection). In addition, the tumblers & plates will be made of a resistant and thermo-resistant material and capable of undergoing changes in temperature that can be translucent or solid (4). In both cases, there will be marks (22 & 23) in their design that indicate different volume metrics (19 and 20) for easy recognition in solid materials. The spout of the tumblers include a hidden interchangeable method (44) under a screw-able system (43) to be able to use the type of spout or lid to use (18 and 55). To protect the integrated circuit with NFC & BLE chips from unnecessary actions, products include a special key to be able to open the secured area (13 & 49) that include key entrance slots (14).

By adding NFC & BLE chips and be able to integrate product with digital solutions like Mobil apps, there will be multiple applications/solutions to be used by product owners and food franchises and companies that required to reduce waste generated by a disposable product. There will be means to create applications that embrace a new type of trades and interactions between product and food franchise owners to promote the use of this proposed reusable tumblers, vessels and plates. By including BLE, this give the capacity to keep your product always with you and locate it on a closed area or use mobile apps to locate it by using GPS features on smart products. There is a capability to add more features on the circuit board like temperature sensor, accelerometer among others.

The lid shall have a slide-on plug (12) which will be integrated into the lid by means of a metal base with magnetic and rotating properties (16) and a protruding metal integrated into the slide-on plug with magnetic properties (11), this section will include a plug with magnetic features to close the area to insert French press plunger rod (37). The lid will use the sliding straw stopper, a raised surface to close and/or open the opening for the use of straws (30), the opening for regular liquid intake (29) and/or close both liquid release openings. The lid and the metal base will include a central entrance (33) to be able to install French press plunger rod (51), if needed, and a magnetic plug to close this area while this accessory is not used (37). The lid will also include special hooks (32) down the area to install special accessories like an infusion filter (45). To add a suite of product to coffee enthusiasts, a special lid that merge a regular lid with pour over cup (144) and included a filter area (142) and the main filter (145) to have an smooth pour over method.

Figure 10:
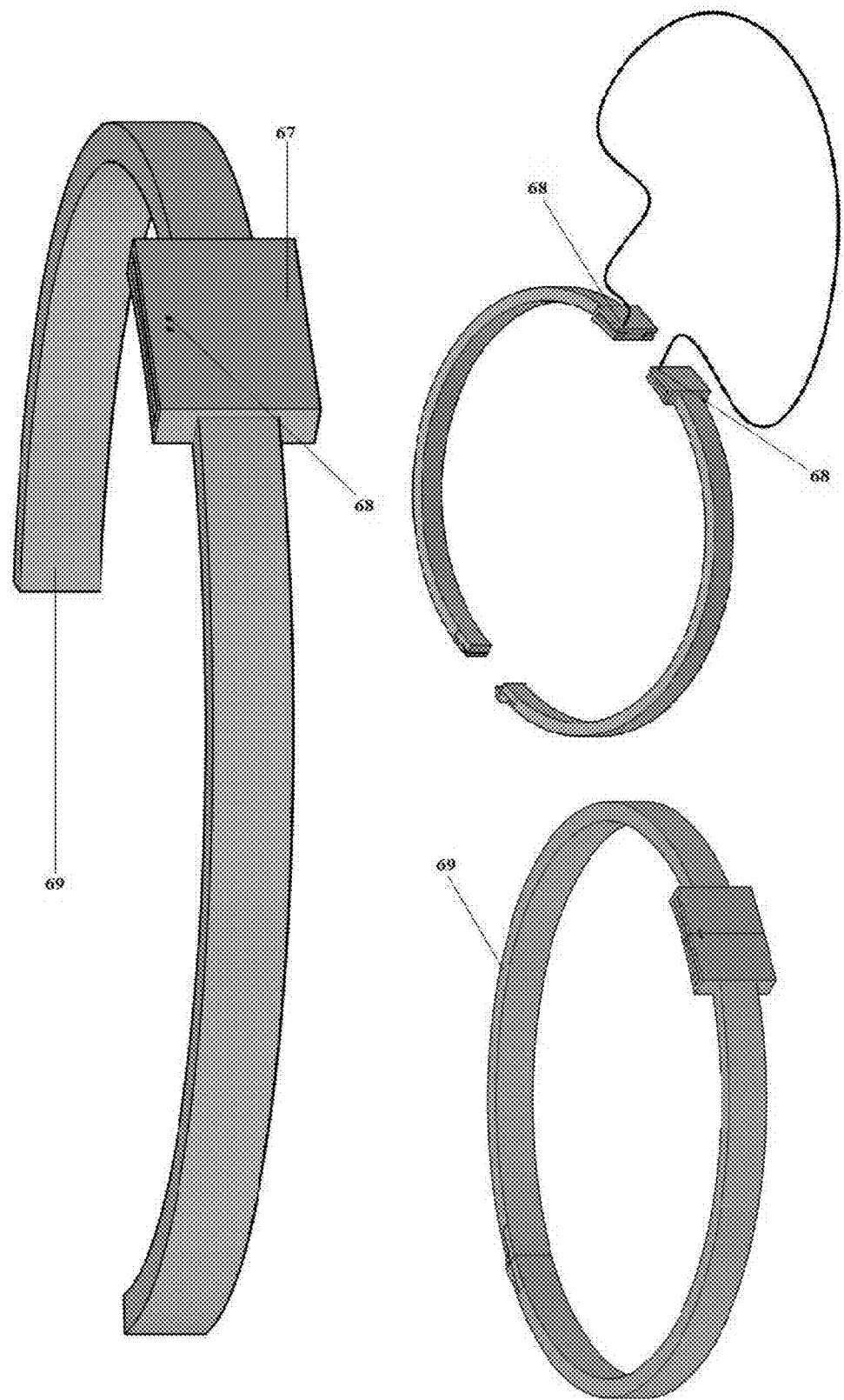
FIG. 10 is a perspective view of the two types of primary holder with feature to install a ribbon/ties to use on key rings
Figure 11:
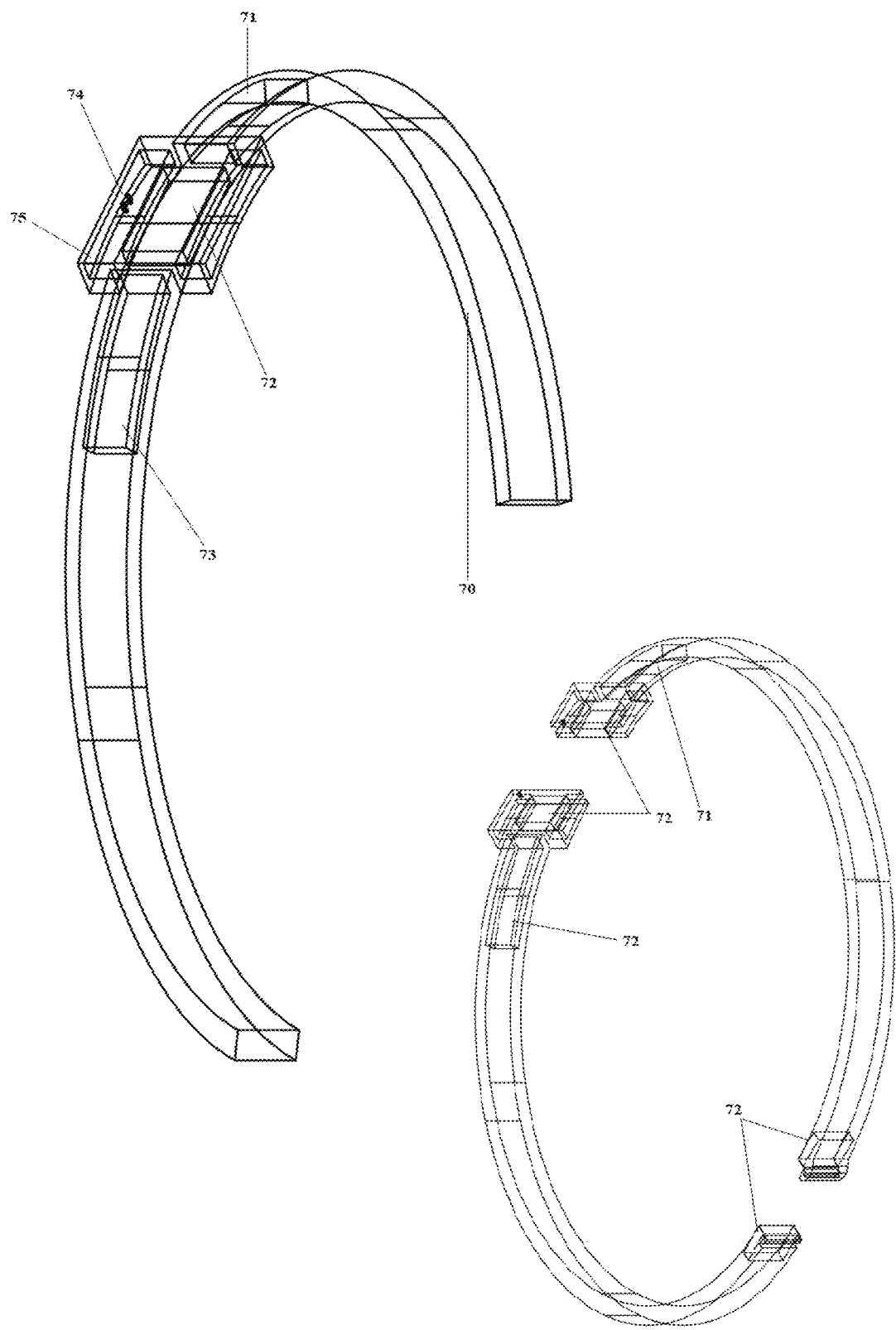
FIG. 11 is a perspective view of internal magnetic components embedded on primary holder's models

There will be accessories for the easy portability of the cup, these holders will be modular (FIG. 9), having two parts: an isolated primary holder (60) and secondary modular holder (56). The primary holder will hold the tumbler and/or vessels through pressure and metals with magnetic properties embedded in its base (71, 72 and 73). There will be two types of primary holders based on a unique piece or a segmented design that increase support (FIG. 10 and FIG. 11).

In the same way, the primary holder can be used through ropes and/or ties to be anchored to a similar key ring (68 and 74). The secondary modular holder of the unified accessory will contain a support and resistant clip (59) to be anchored on thin and flat surfaces for easy adherence. This base will have anchoring tongs (58, 80 and 88) that will fit perfectly with the main holder for greater control and transport safety. In addition to this, the secondary modular holder include a storage area (62) to store a sectioned straw (64, 65 and 66) that can be assembled by unifying each of its ends.

Another modular accessory of the invention are the cup holders (FIG. 12 to FIG. 15), which will use the primary holders as base elements to fulfill their function, added to the anchoring tongs included in a fixed base by support slots (68). The fixed base (76) on this occasion will include a handle that will function as a cup holder (81). As added utility, the cup holder will come with either a single base or a multi-function base that will include a storage area for a selected straw. To release primary holders from cup holder, there will be retractile buttons (57 and 79) to release them.

The modular plate (98) is a composed of individual plates (94, 95, 96 and 97) that will be anchored one after the other by means of solid anchors/clips (105) and fixing holes (112 & 113) to give rigidity to the unification of the dish on specific areas (127, 128 and 129). In addition, the individual plate will be able to generate a cube (99) that will allow the transport of other elements (137) and have the function of a snack box (136). This box will be formed starting from two pieces stored inside two of the individual plates; a closure part (132) and a base part (133), fixed and that will contain the integrated circuit with the NFC and BLE. The part with the integrated circuit will have the highest IP protection of the modular plate.

On the group of items with BLE & NFC chips (141) there is a modular bucket (138) that is planned to be used when product owner is want to take some food related products to pick & go schema. To easy manage food products, there are splitter divisions (140) to be installed on a slits (139) inner areas on the bucket. The food delivery services are part of the main user of disposals and included with modular bucket there is a group of product dedicated specifically to serve this filed, a delivery bucket is included on the solution (146) and the size if a reduce a few to be able to use it as exchange device (154) with the modular bucket, the bottom of the delivery bucket is collapsible to release food product to the customer's bucket and includes a plunger rod (155) to be used as based for the locker solution (149) and a stopper (148). The product will be released when locker is removed and push rod down to release gates holder (153) that included the NFC & BLE chip.

A delivery box (156) is included as part of delivery solutions to be used by food delivery companies/services to exchange their products with modular plates (162). The bottom part is collapsible to exchange the products and is secured by a plunger rod (157). The NFC chip is included on the bottom area of this invention (161)

Each individual plate will have a special function for the creation of the unified plate and the cube; likewise, they will have specific storage and anchoring functions. All the plates will have security holes to hold the anchors and the closing piece and integrated when generating the cube. As an important element, there will be plates that store a greater number of anchors internally based on their function, and other individual plates will store the closing parts, another the integrated circuit part, and another a container to store your own reusable cutlery (106). All with the aim of reusing tableware, reducing the use of disposables and supporting the restoration of natural resources.

The invention includes the first application under digital solutions that will merge mobile app and a web service to be used in smartphones, tablets, PDAs and other with the utilization with the tableware products to create a rewards process that will benefits food franchises and invention product's owners. This initial process is not limited the capabilities to create more application and web services and/or add more features, process or technologies on the digital solutions or products. The process flow start with the acquisition of the invention products with NFC & BLE chip via Internet e-commerce services or authorized stores, the owner need to register the device using a web application or mobile app to complete the assignation to the product to a specific user ID. The increase the ties between owner and product, the application/web tool include the features to locate the product using BLE signal and a map is included on the application design to geo reference, only registered products on each user profile will be able to be located a mesh of GPS system with other smart devices could be used if needed and under user policy agreements.

The process using digital solution will be available in multiple languages (FIG. 30) and to register/create a user profile, a need to have a valid public email address is required and accept user and security policies. The business accounts will be included on the app main maps that will guide product's owner to the near places where they can receive special rewards/redeem to use the invention's products, special search boxes are included on different sections of the application to look for specific food franchise or type of food/drinks of preference.

The business accounts will be able to request customized invention's product that includes trademarks and logos based on their franchise policies and designs previously approved by them, business accounts are going to be able to manage their stores and rewards systems per store and GEO location. There will be an option to authorize if all type of invention's product can receive rewards, just specific types of companies that are not under the same business or policies and/or just the special inventions' products' with their trademark/logo can receive/redeem rewards. Business accounts are going to have access to a special web tools and application to read NFC from Inventions' products and have specific e-commerce functions.

Figure 31:
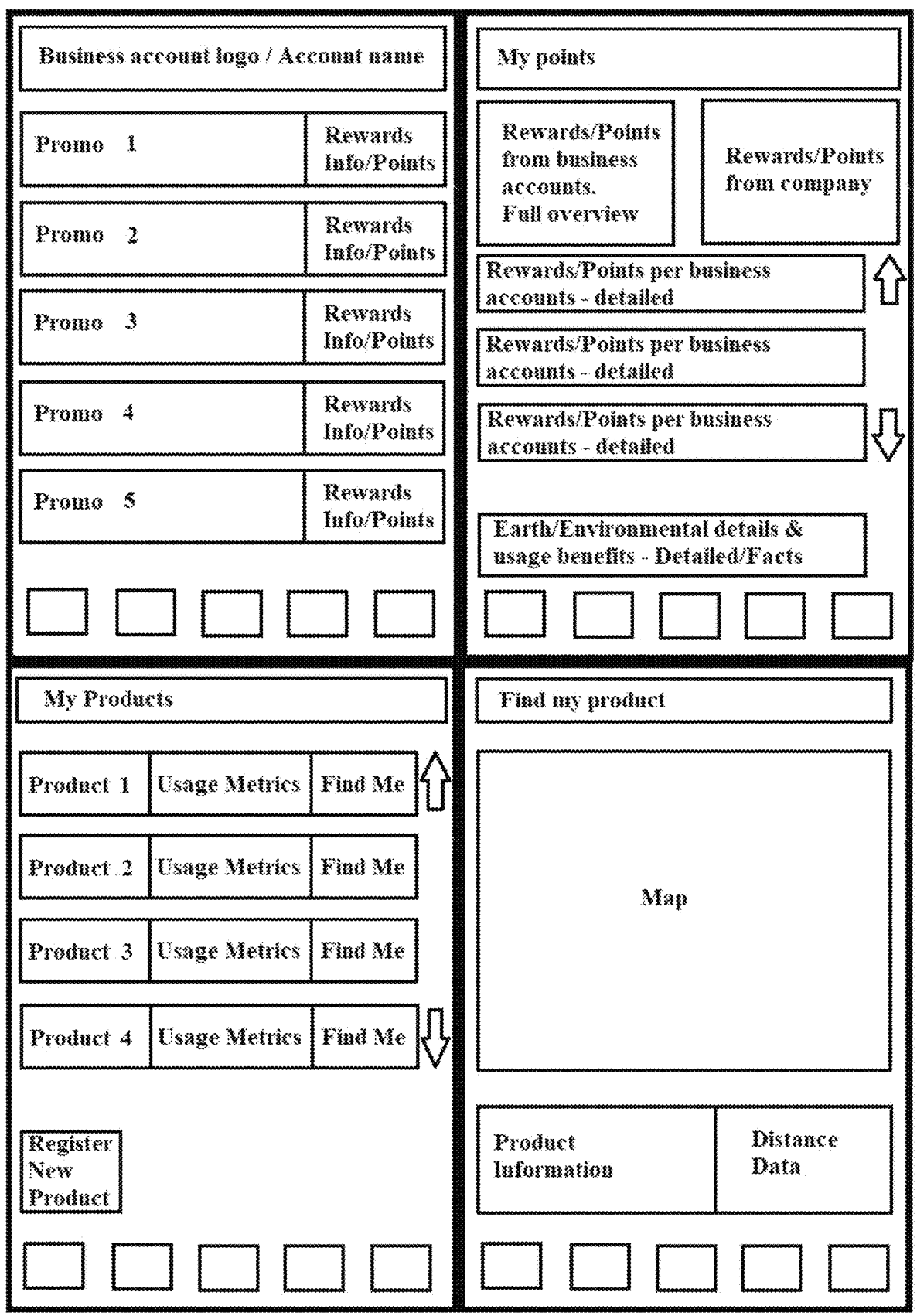
FIG. 31 is an example of mobile app displays.

When a product's owner/application user select a business account, they will be able to locate on the map the closes branch to his location and review the rewards options that business accounts make available on the system. Each time the invention's product request to receive/redeem rewards will need to reach the product near to a POC/PDA/other NFC receiver and the application will confirm the invention's product owner the number of points and/or benefit received. A section to track/manage points/rewards will be included on the application and web tool and will include the rewards/points related to each business account/food franchise and the ones related with the proprietary company (FIG. 31). There will be a section on the web tool and application that will provide to invention's product owner and business accounts an overview of the benefits to date generated by the usage of Invention's product to environment and how many disposals has been avoid to be used. The business accounts/food franchises will be able to track cost benefits on the system based on the number of transactions made that remove usage of disposals.

The user is able to register multiple products to his profile and use them on the food franchises and places to avoid disposals. The food franchises and companies are able to create business accounts to manage a special rewards schema that is under their management to assign the franchises' point/reward based on the usage of invention's products and marketing strategies, in addition, there are special points assigned for each use of the products that are independent from franchises' points.

The product's owners are going to be able to take their product with them at any place to avoid the usage of disposals and food franchises will use endpoints (POS/PDAs/others) with mobile app installed to detect NFC and unique product ID to track usage and assign points to specific User ID. By making tableware items like tumblers, plates, vessels, buckets an smart items able to be synced with digital solutions we are adding food franchise and consumers the capabilities to reduce the usage of disposal and create a solid tie between owner and product by adding BLE beacon feature to easy location of products. There will be key factors that will increase benefits to product owners and food franchises:

Decrease the use of disposals
New loyalty programs strategy for franchises
New revenue method by promote reusable products on their food chains
New rewards program strategy
Brand reputation
Create different applications and/or digital solutions that could be merged with NFC commercial trades.

There will be additional gains to the aim to preserve and restore natural environment with the usage of tumblers, plates, vessels as a trend like:

Decrease use of plastic and paperboard disposals.
Keep programs to maintain use of this solution as trend will reduce the predation of natural environments to obtain raw material.
Reduce plastic and paperboard pollution in cities and hydric resources Start a new green trend in areas that are critical but left aside.

Create new revenue areas by adding modular component that can be merchandised separately by different franchises.

DETAILED DESCRIPTION OF THE DRAWINGS

Some embodiments of the present inventions are illustrated as example and are not limited by figures of the accompanying drawings, in which references may indicates similar elements and in which:

FIG. 1: This is the representation of the tumbler design at glance. The invention is comprised of multipurpose tumbler's bottom that can be exchangeable with other designs upon customer's choices (1). This includes a piece with a resistant material and IP protection (2) that protect the NFC & BLE main board (3). The tumblers will have metal or plastic materials (4) and magnetic areas (5) that will be used to secure it on cup holders. In addition the design will include volume metric levels and will have areas/marks that shows customers were the metrics are placed (6) and will have a screwable top on the tumblers (7). They will have removable jar lid (8). The jar's lid will be multiple features and will include a metal piece with magnetic features (10) that will hook a magnetic plug to close entry area for one of the tumble's accessories, French press plunger rod (17). The jar's lid will also include a slide-on plug which will be integrated into the lid by means of a metal base with magnetic and rotating properties and a protruding metal integrated (11) into the slide-on plug with magnetic properties (12). Tumbler's button will be secured to avoid removal of circuit board and protect it, the area to protect will have a solid shield embedded on the tumbler (15) and this piece will be removable with an special key (13) that will have access to secure slots on the tumbler (14). The multipurpose jar's lid will include an extendible infusion filter (16) and at any owners will, the screwable top on the tumblers can be removed to install a desirable top to use (18)

Figure 2:
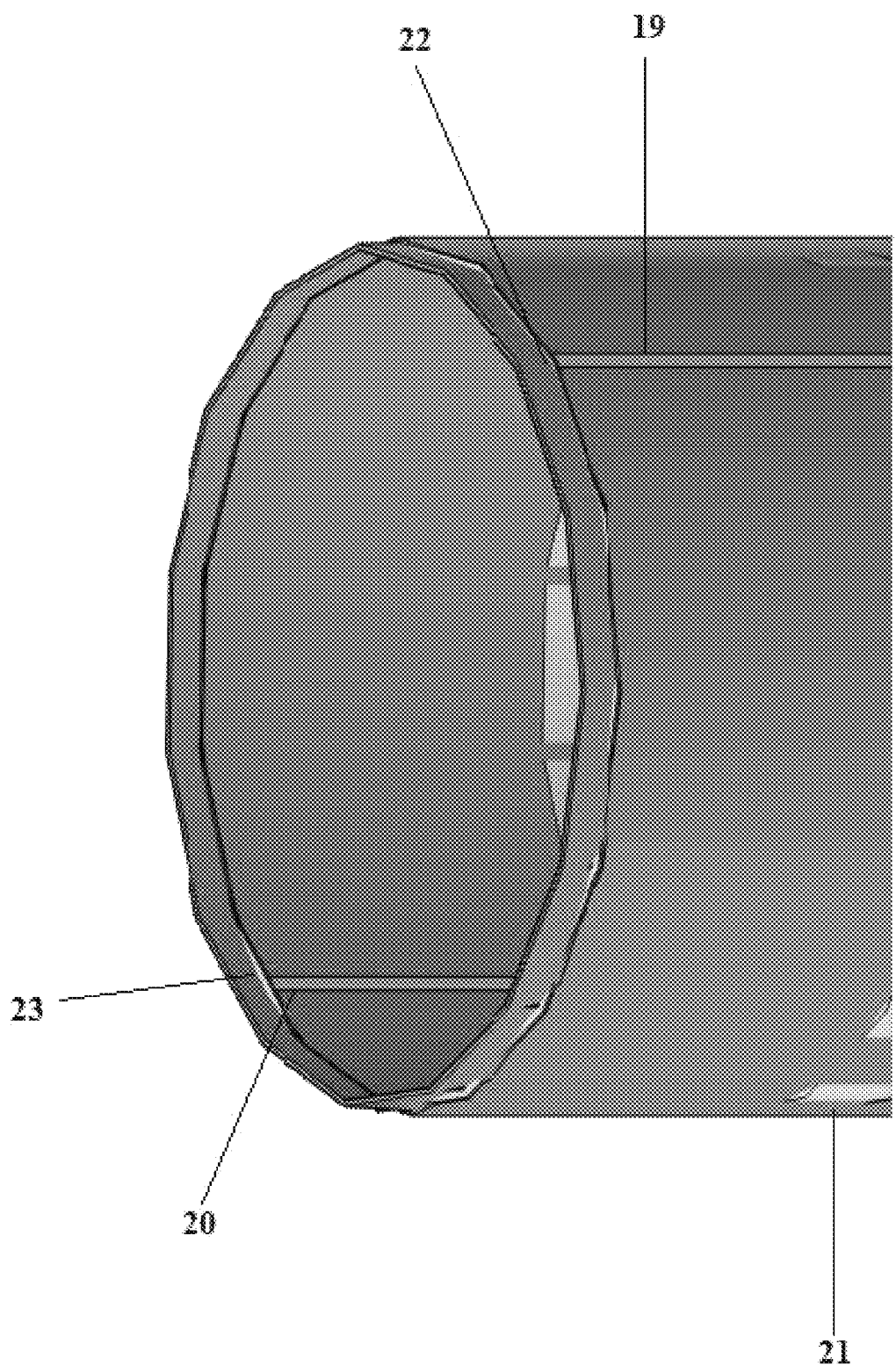
FIG. 2 is a partial perspective view that shows the magnetic embedded areas and screwable nozzle section features on the tumbler and the internal measuring level.

FIG. 2: The tumblers have internal metrics to show customers the one to select based to the need (19 & 20) and a removable top that specify the area to unlock the top (22 & 23) and indicated were the metrics are located. The items will have areas with magnet features (21).

Figure 3:
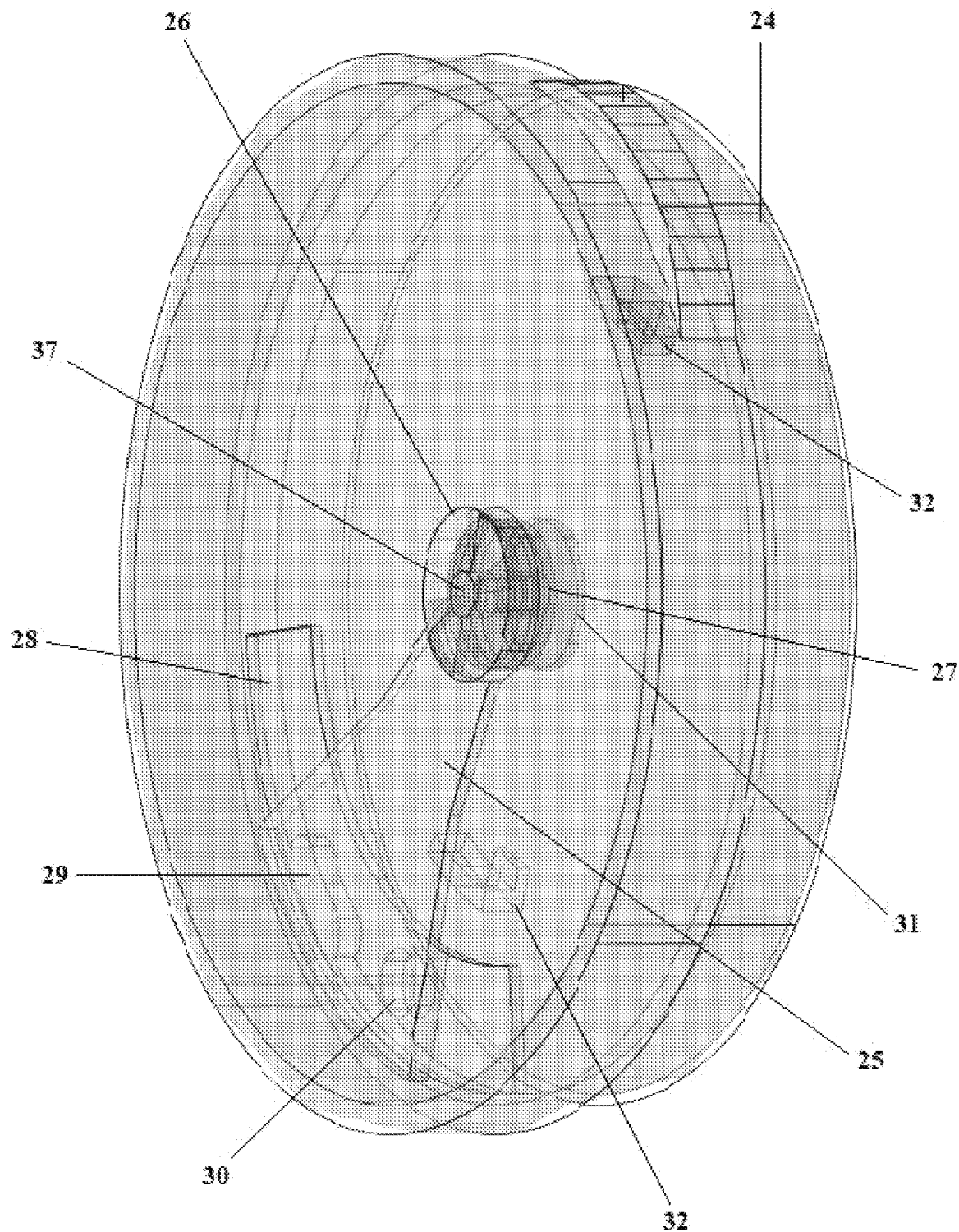
FIG. 3 is a perspective view of modular tumbler lids with magnetic section embedded to install slider plug and bottom plug with magnetic features

FIG. 3: The tumbler's lid will have an area to seal from liquid spills (24) and a removable slider (25) to cover the apertures for straws (30) and normal intake (29). The slider will be placed into an embossed area (28) that will be a guide to secure closure moves. The slide-on plug will be easy to move with a magnetic piece embedded on it (16) and a rotatory metal piece embedded into the lid (27), there will be a removable plug with magnetic features that will close the area to install a French press plunger rod (37). The tumbler's lid will be multipurpose and will include a center area to install a French press plunger rod and close the area with a magnetic plug (31) and install a screwable infusion filter on special and solid hooks (32).

Figure 4:
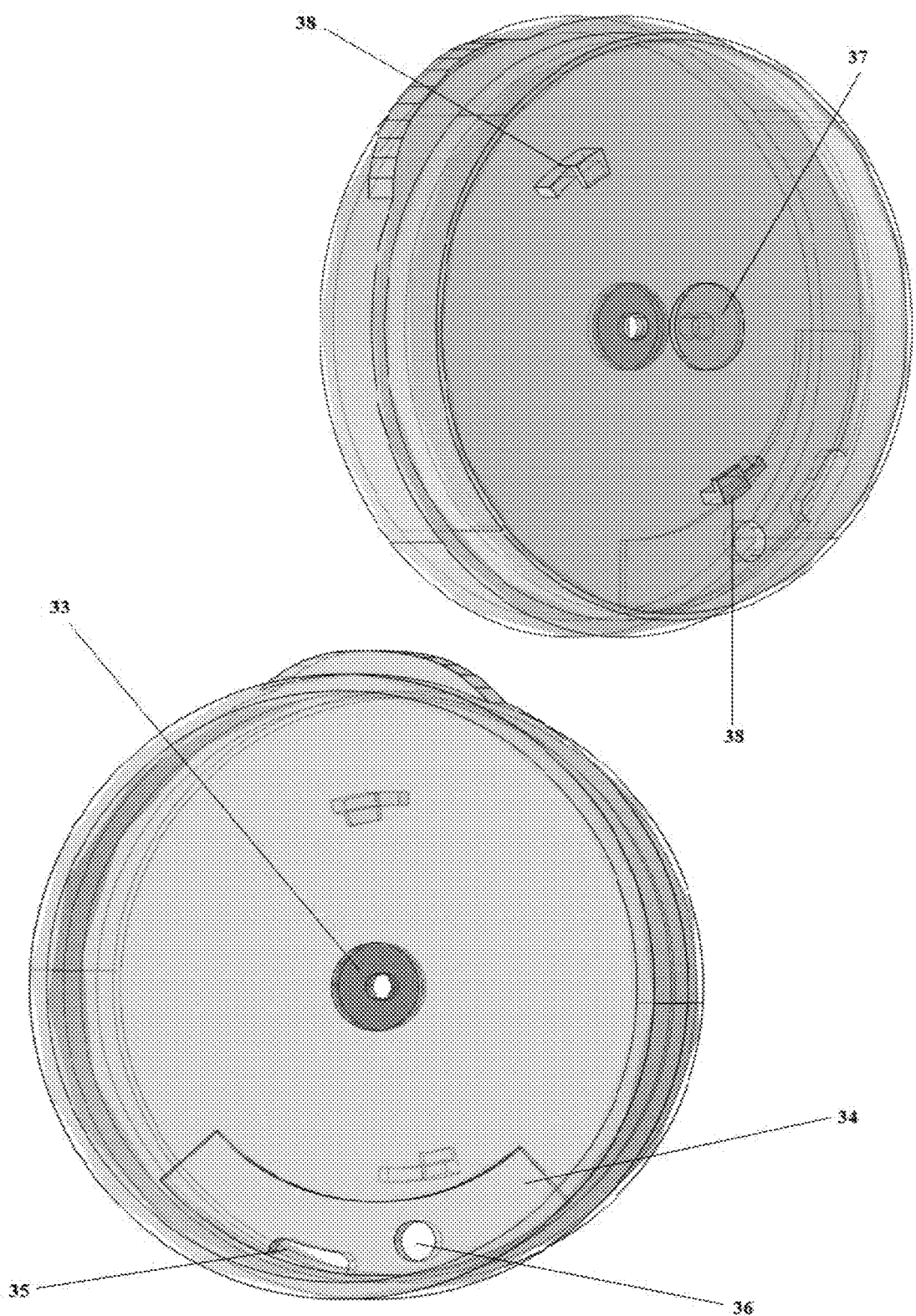
FIG. 4 is a perspective view of the modular lids with to identify the areas to install accessories like French press plunger rod and infuser. Rotatory metal embedded on the central area

FIG. 4: The tumbler's lid will have a rotatory metal piece embedded (33) that will help to merge with slide-on plug's magnet area. The slider will move into an embedded area and reel (34) to secure the moved and keep the slider locked while use select how to use the slider: normal intake (35) or straw (36). This piece will include a special and solid hooks to install an infusion filter (38) and a magnetic plug to close and seal French press' plunger rod entrance (37).

Figure 5:
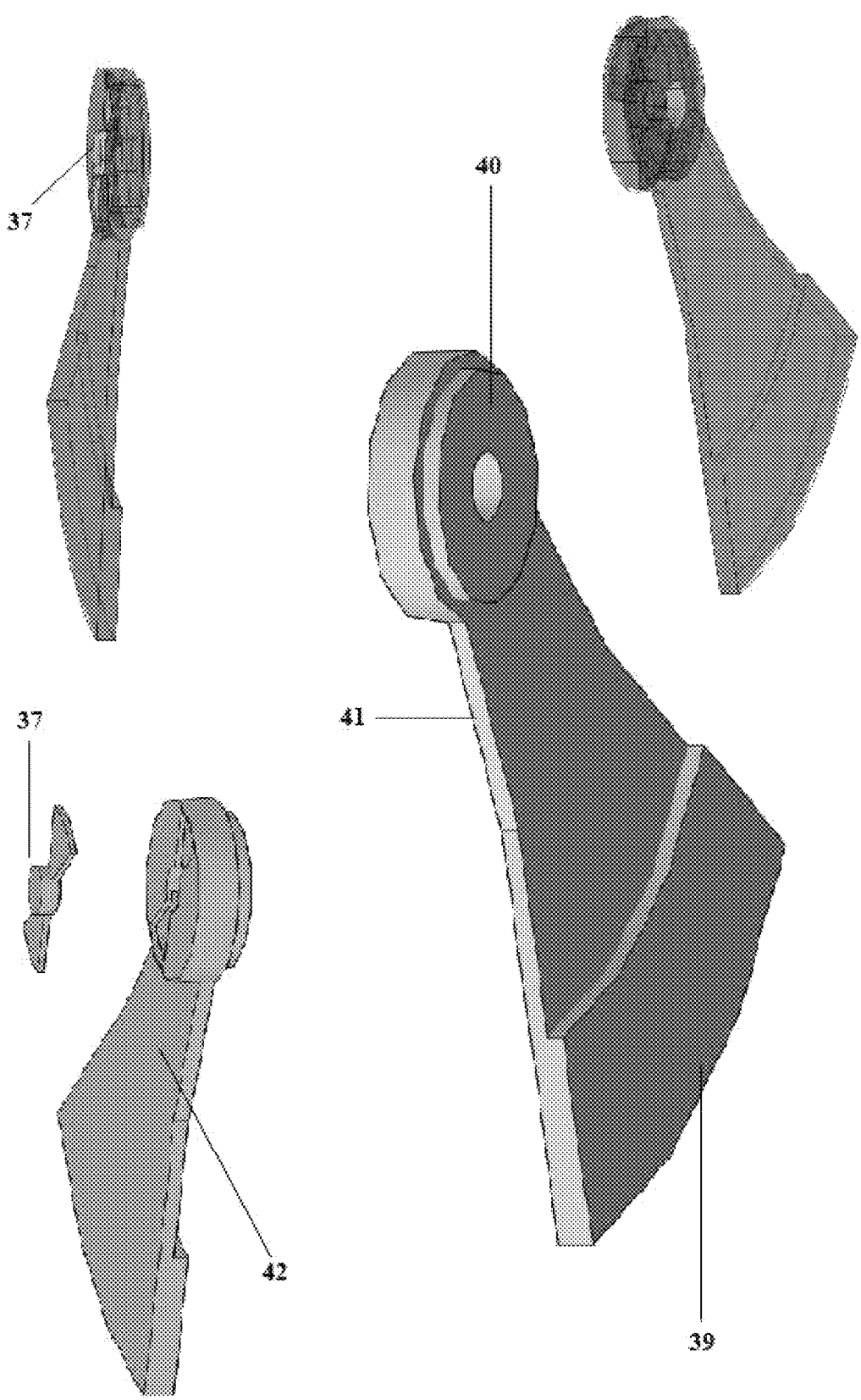
FIG. 5 is a perspective view of a lid's slider plug that includes an embedded magnetic part.

FIG. 5: The slider will have an embedded area (39) that will match with the cap area. This area will be part of a solid material (41). This piece will have a piece with magnet features (40) that will be used to secure and merge the slider with the rotatory piece on the cap. The magnet will not be visible once the slider is installed (42). The slider will also include a removable plug with magnetic features to close the area to install a French press plunger rod (37).

Figure 6:
FIG. 6 is a perspective view of the embedded screwable top nozzle that can grant owners the peculiarity to use lids by pressure or twisted screw features

FIG. 6: This is an example of the tumblers screwable nozzle embedded area in the tumbler that will allow to add additional types of lids based on owner choices (44).

Figure 7:
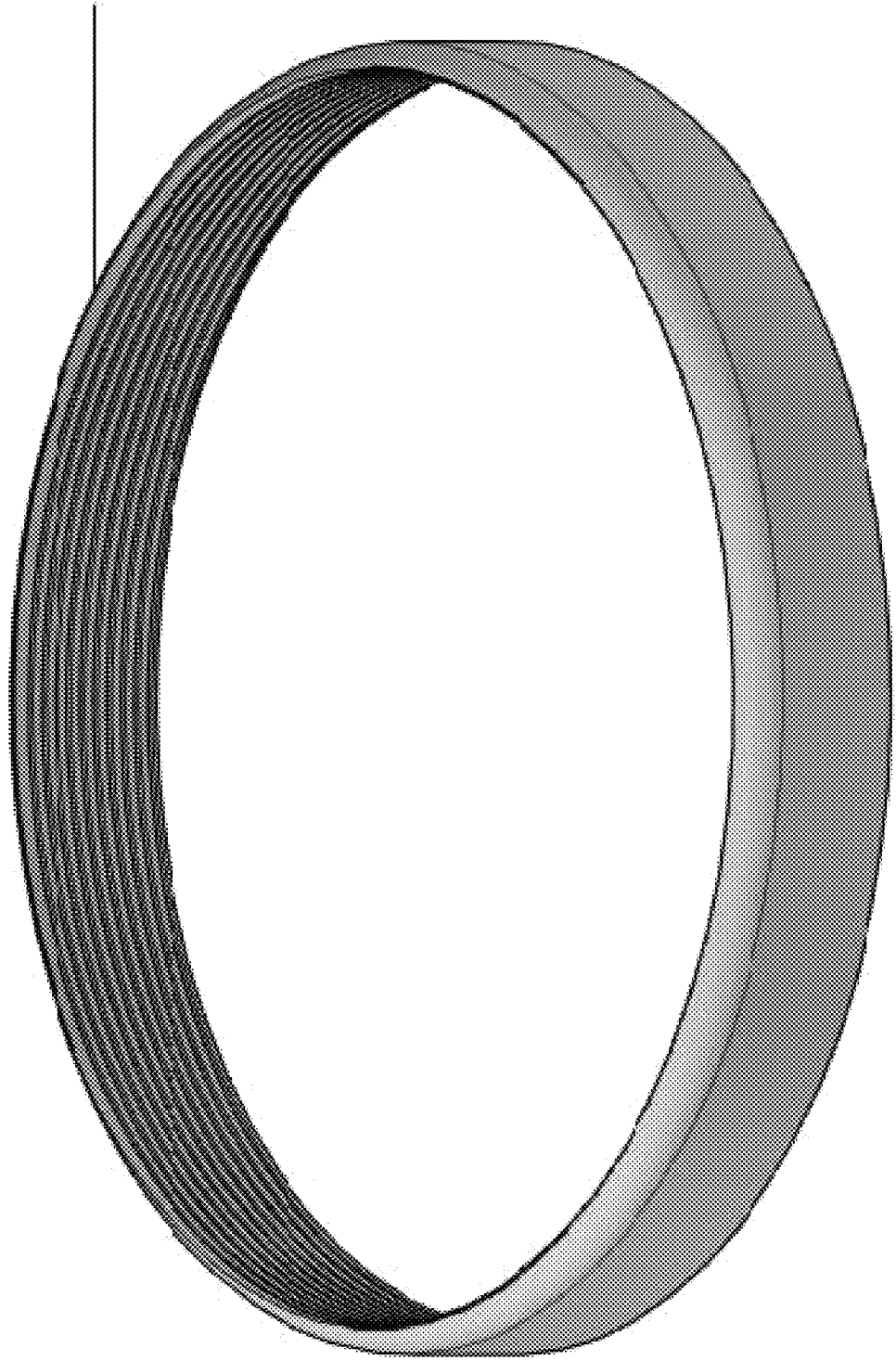
FIG. 7 is a perspective view of the top nozzle cover to hide screwable section during usage of lids by pressure

FIG. 7: This standard type of removable nozzle cover to simulate a regular tumblers (45).

Figure 8:
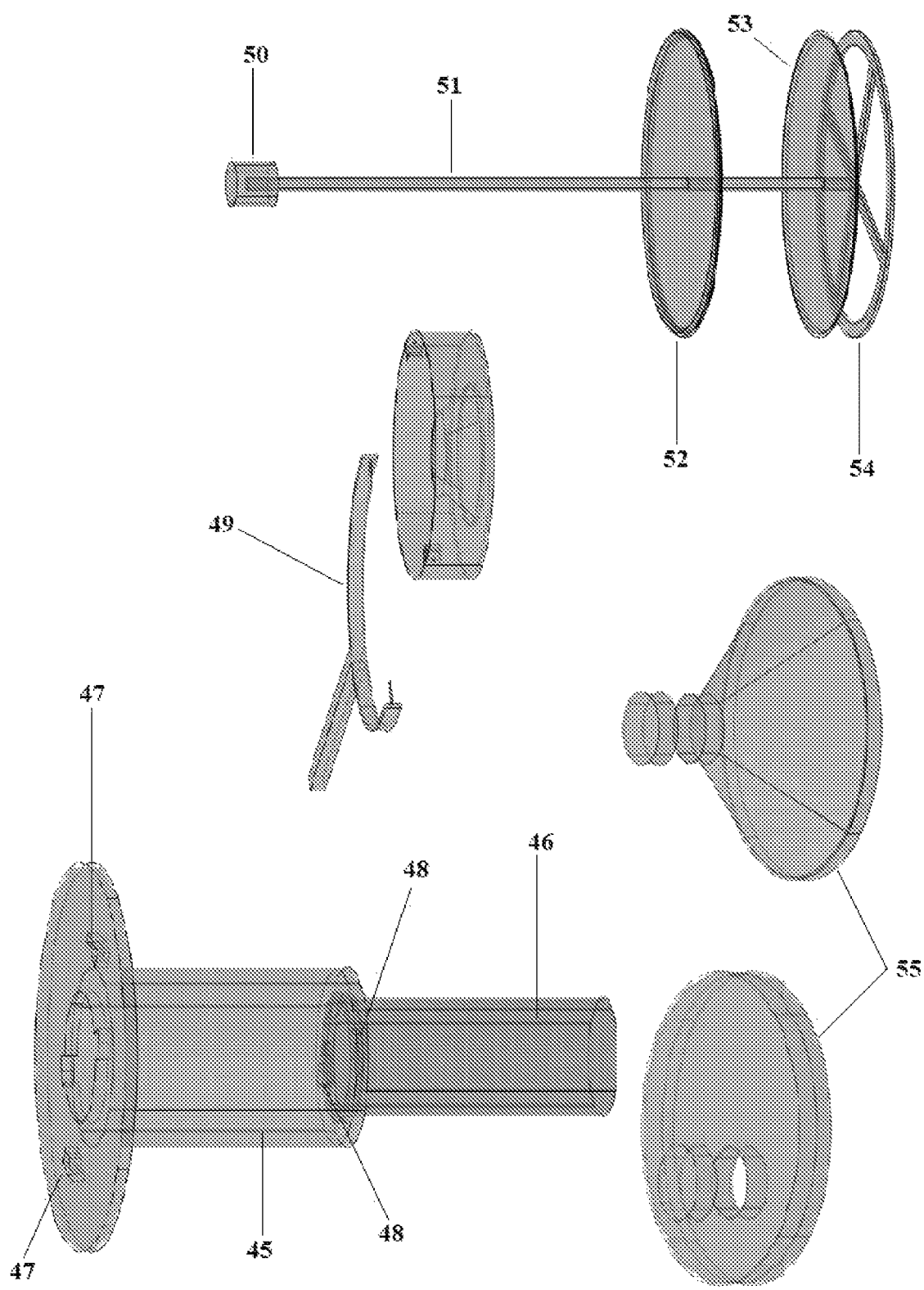
FIG. 8 is an exploded perspective view of base accessories, the exchangeable lids, special key to open area that protect circuit with NFC & BLE circuit board, French press and a length extendable infuser filter.

FIG. 8: The tumbler will include special accessories that match its features, like: Extendible infusion filter (45) that will have an extended part to increase its length for tall tumblers (46), this part will include a screwable slots (47) and a secure twisted locks to keep the extended length (48), these locks will also include internal prominences to add new modules/products. There will be a need to have a special key (49) to be able to open the secure area that host the circuit board. A coffee French press accessories is included and will have a removable plunger knob (50), a plunger rod (51), a spiral plate (52), filter screen (53) and a cross plate (54). Different tumbler's lid will be available to install on the tumble screwable top (55).

Figure 9:
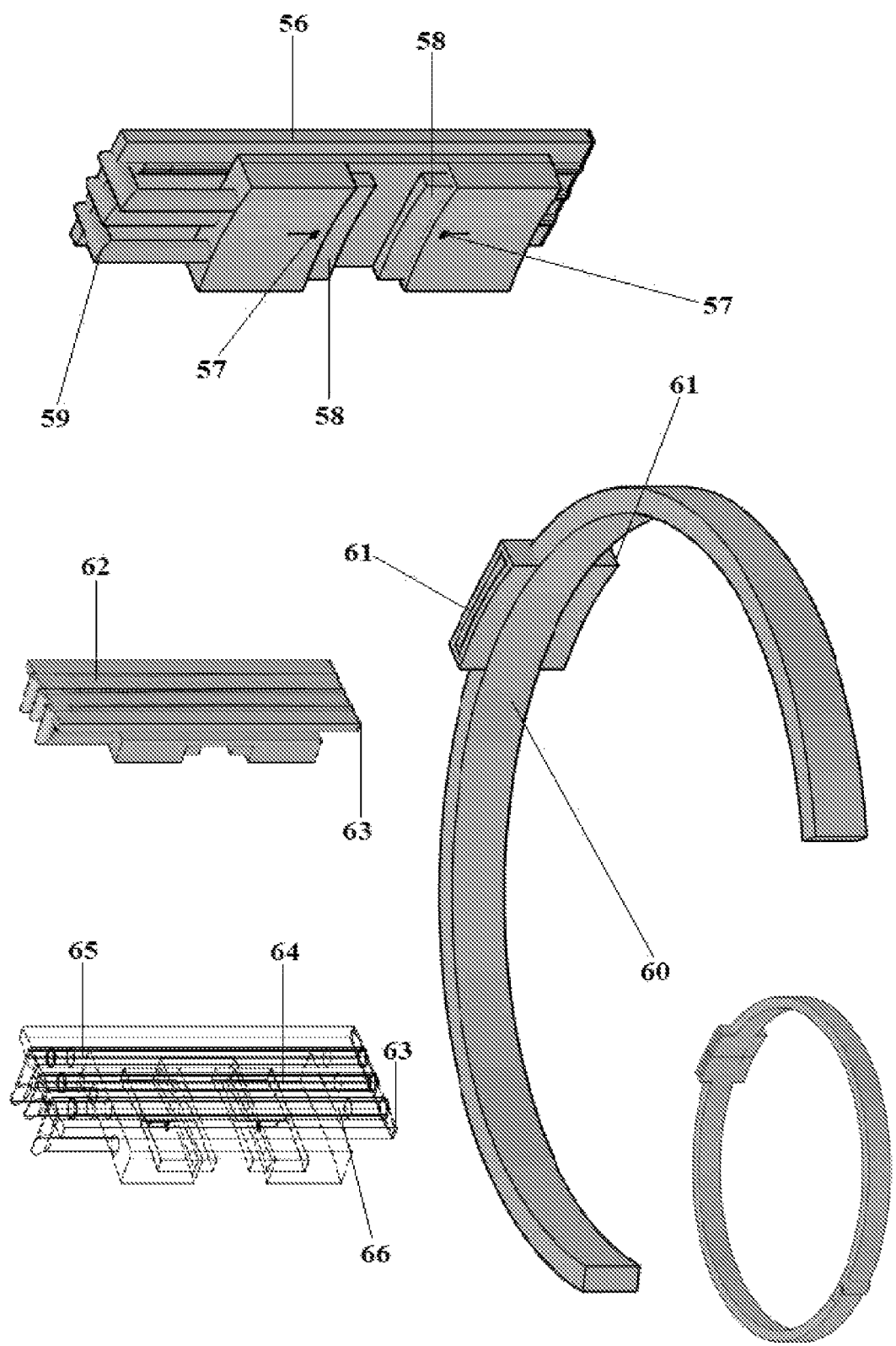
FIG. 9 is a perspective view of a cup holder feature that include a modular holder with primary section a secondary modular holder. This includes the types of primary holders.

FIG. 9: This is the example of the modular transportation holder. The holder will have two main parts, primary holder and secondary modular holder with straw storage. The secondary holder (56) will be connected with a clip (59) that will help to attach the holder to a back pack or a handbag. This part of the holder will contain retractile buttons (57) to deploy hooks (58) to hold the primary holder (60). The hooks will be embrace the primary holder on support slots (61). The secondary modular holder will have a storage area (62) to hide and store a sectional straw (64, 65 & 66) and there will be a removable base (63) to extract straws to use it. Included on the figure the two types of primary holders: one piece and segmented design.

FIG. 10: This is an image presented the two model of primary holders: one piece and segmented designs. The primary holder which will have a rigid base (67) to attach with secondary modular holder. The primary holder can be used without secondary holder component by having a ribbon or thread to support it on the support holes (68). The primary holder will have a strength support of the tumblers with pressure forceps (69) and internal material with magnet features.

FIG. 11: The primary holder will include special features. A forceps (70) to hold the items by pressure and set of internal materials with magnetic features to deeply hold the tumblers (71, 72 & 73) this will help to have a simply transportation using the support slots (75) to install a ribbon in the support holes for ribbons (74).

Figure 12:
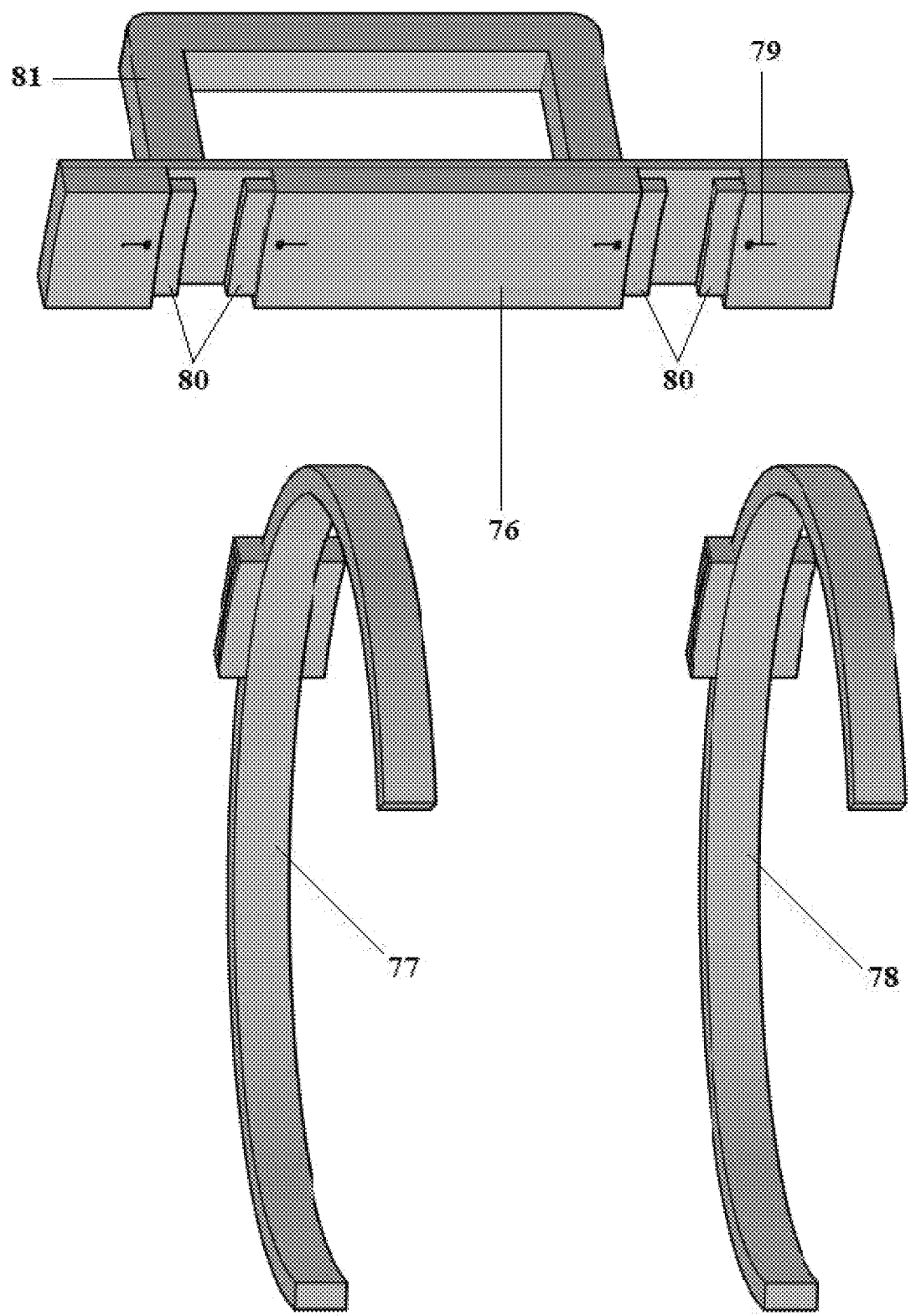
FIG. 12 is a perspective view of an alternative cup holder with modular sections with two primary holders and secondary holder without start storage section.

FIG. 12: The primary holders can be used to create a new utility device, a cup holder in conjunction with secondary modular holder. The cup holder will include a solid base using the secondary modular holder design (76) using a solid material and 2 primary holders (77 & 78) to create a stable cup holder. The cup holder will have retractile buttons as part of the secondary modular holder (79) to deploy the support hooks (80). To easy use, a hand holder is part of the design (81).

Figure 13:
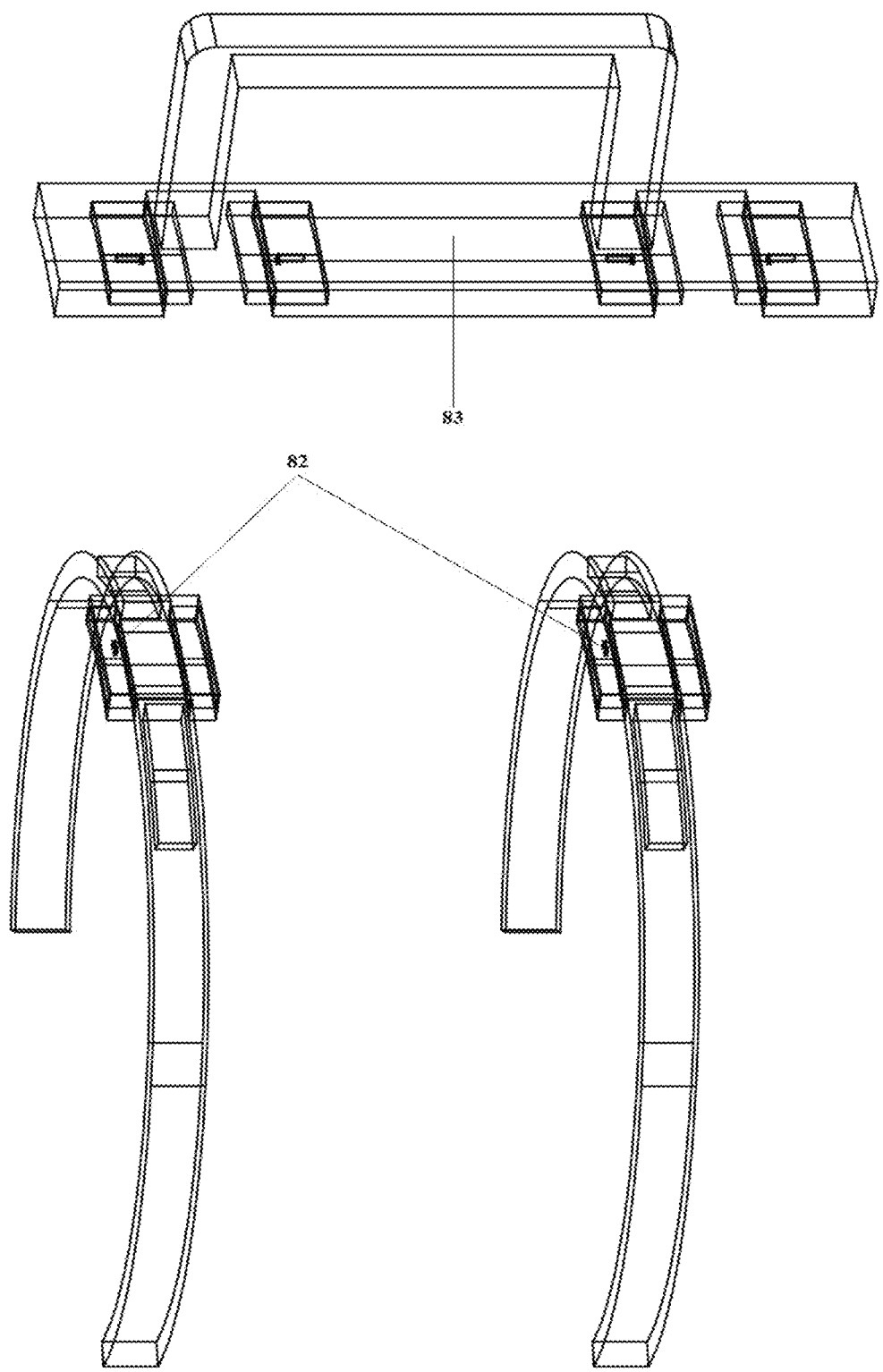
FIG. 13 is a perspective view of an alternative modular cup holder with internal magnetic components embedded on primary holder

FIG. 13: There will be two types of cup holders, the basic cup holder will include the main parts to secure the tumblers, two primary holders (82) and a secondary modular holder (83).

Figure 14:
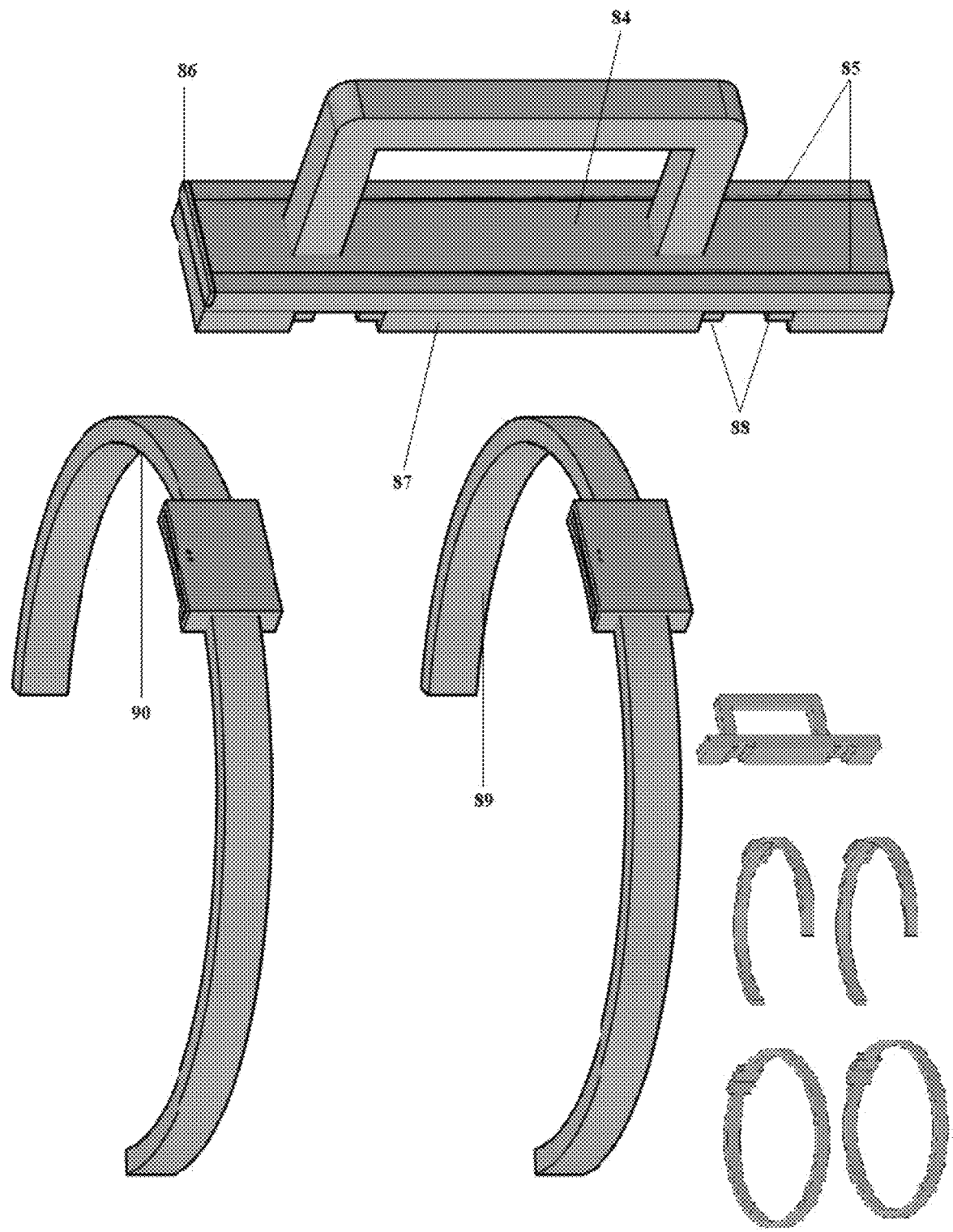
FIG. 14 is a perspective view of an alternative cup holder feature that that includes a hided storage area to store a sectional straw

FIG. 14: By merging features of cup holder with transportation holder, there is a possibility to create a cup holder with storage area for straws. This utility items will have a secondary modular holder (84) to store a sectional straw (85) and a removable top (86) to release the Straw. The cup holder can be attached with two primary holders (89 & 90). The secondary modular holder will be made by solid material (87) and will keep the standard support hooks (88)

Figure 15:
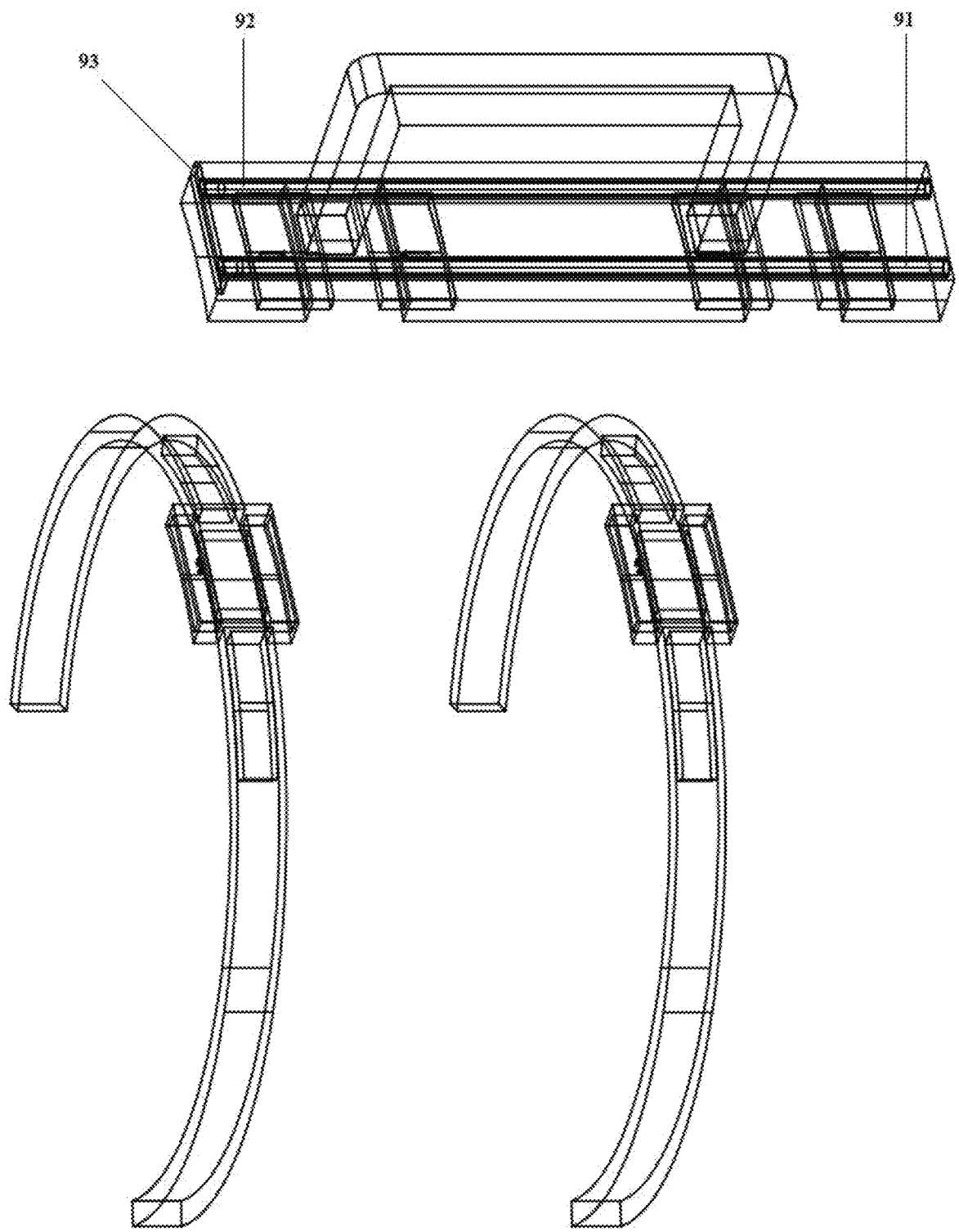
FIG. 15 is a perspective view of an internal storage area of alternative cup holder feature that that includes a hided storage area to store a sectional straw

FIG. 15: On this image we present the internal Straw stored inside the cup holder (91 & 92), and the removable top to extract the Straw (93).

Figure 16:
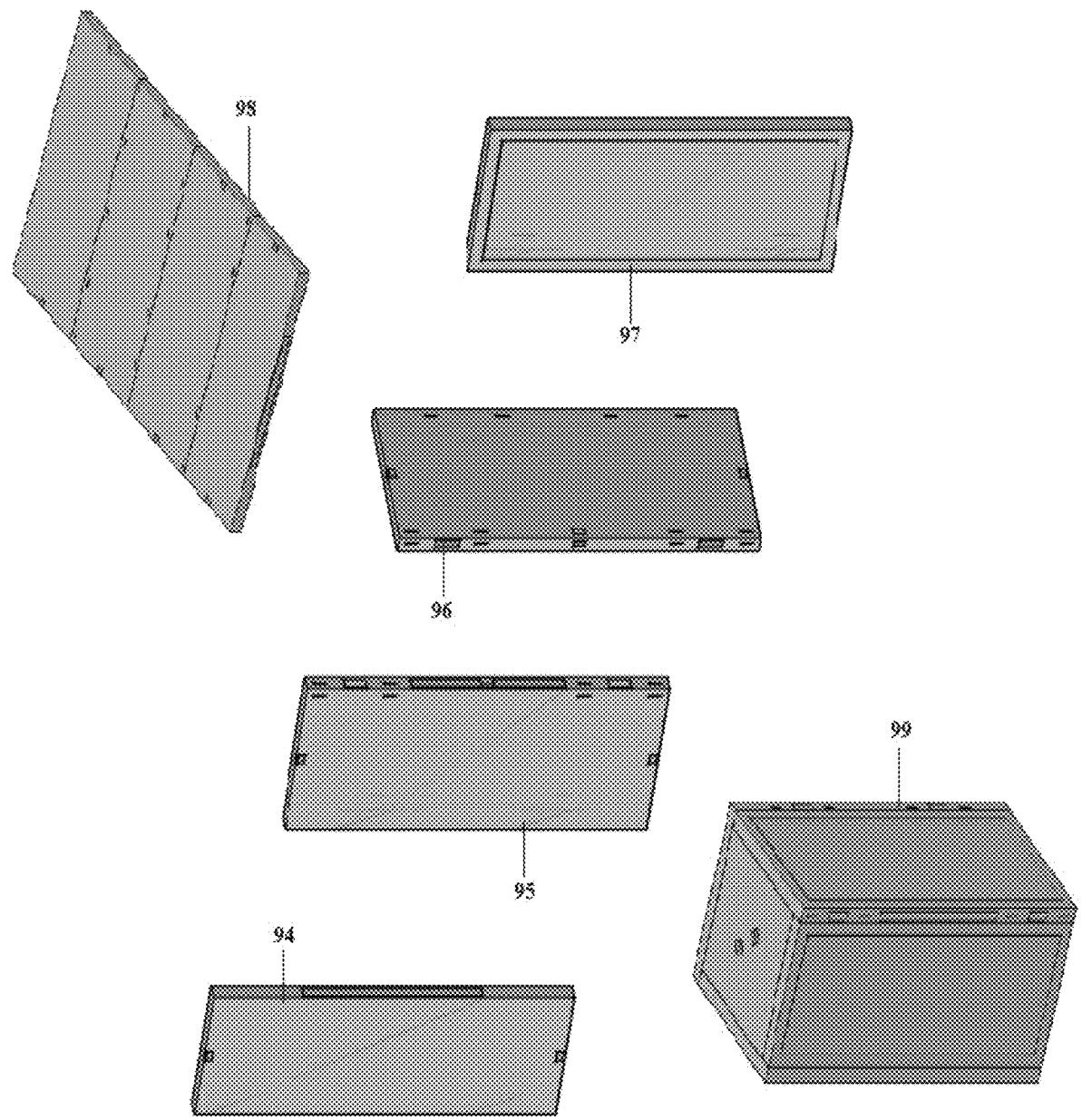
FIG. 16 is a perspective view of a unified plate solution and the sectional parts with the cube mode feature.

FIG. 16: Modular plate with detachable parts which include internal storage each. The plate can be transformed into individual 4 mini plates (94, 95, 96 & 97), a unified plate (98) and a portable cube (99), to store and serve snacks/food.

Figure 17:
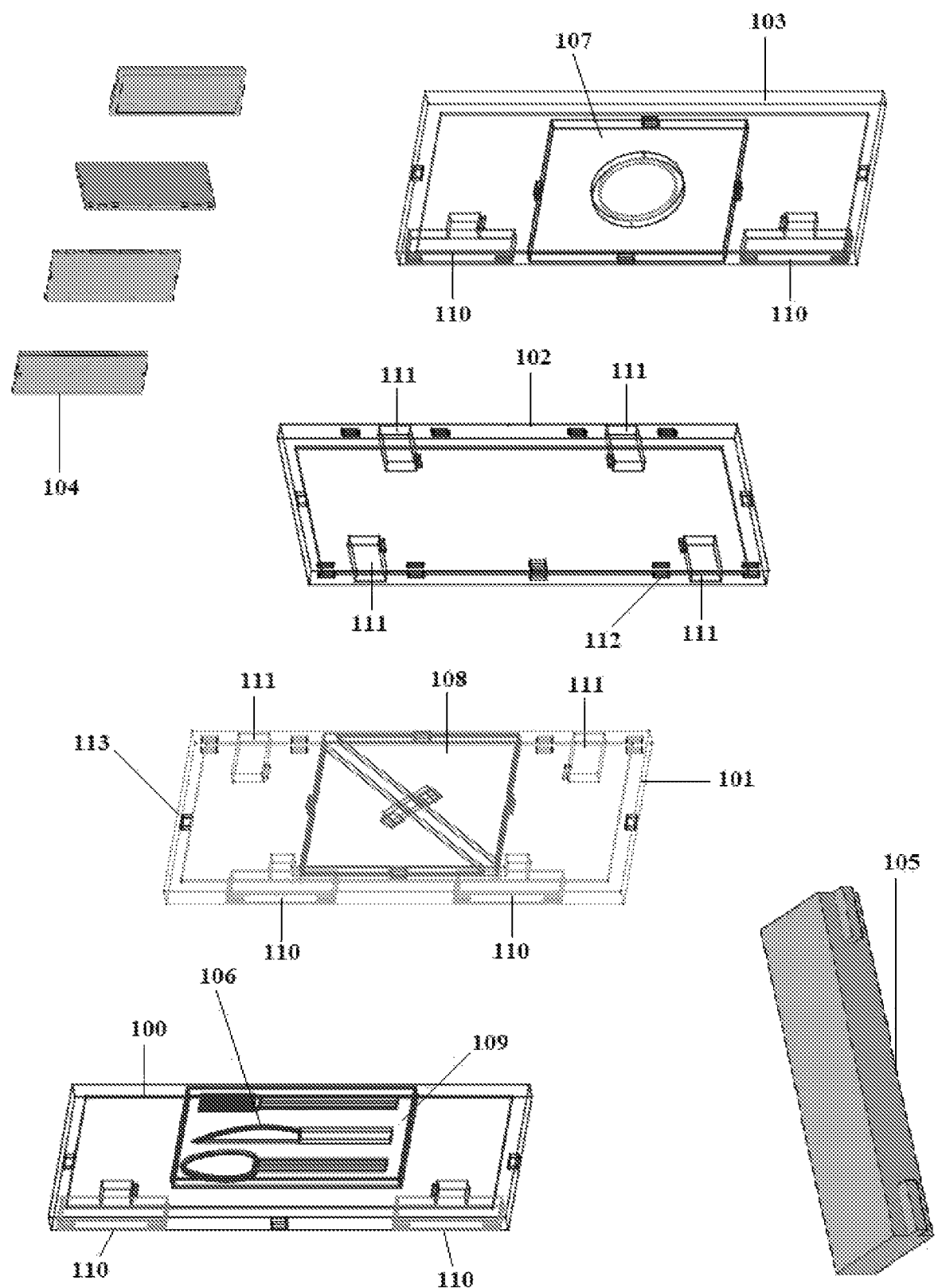
FIG. 17 is a perspective view of an embodiment of individual plate components and features

FIG. 17: Plate 1 (100) include a special container (109) to store cutlery (106), plate two (101) with locked piece storage (108), plate three (102), plate four (103) with piece with Chip board stored (107). The plate one, two and four will store special staples (105) on special storage areas (110). The staples can be used as well as rigid support during unified plate form and use support areas (111). Each face will have secure holes to hold bottom and top pieces and secure Cube form (112 & 113). All individual plates will hide all components internally (104).

Figure 18:
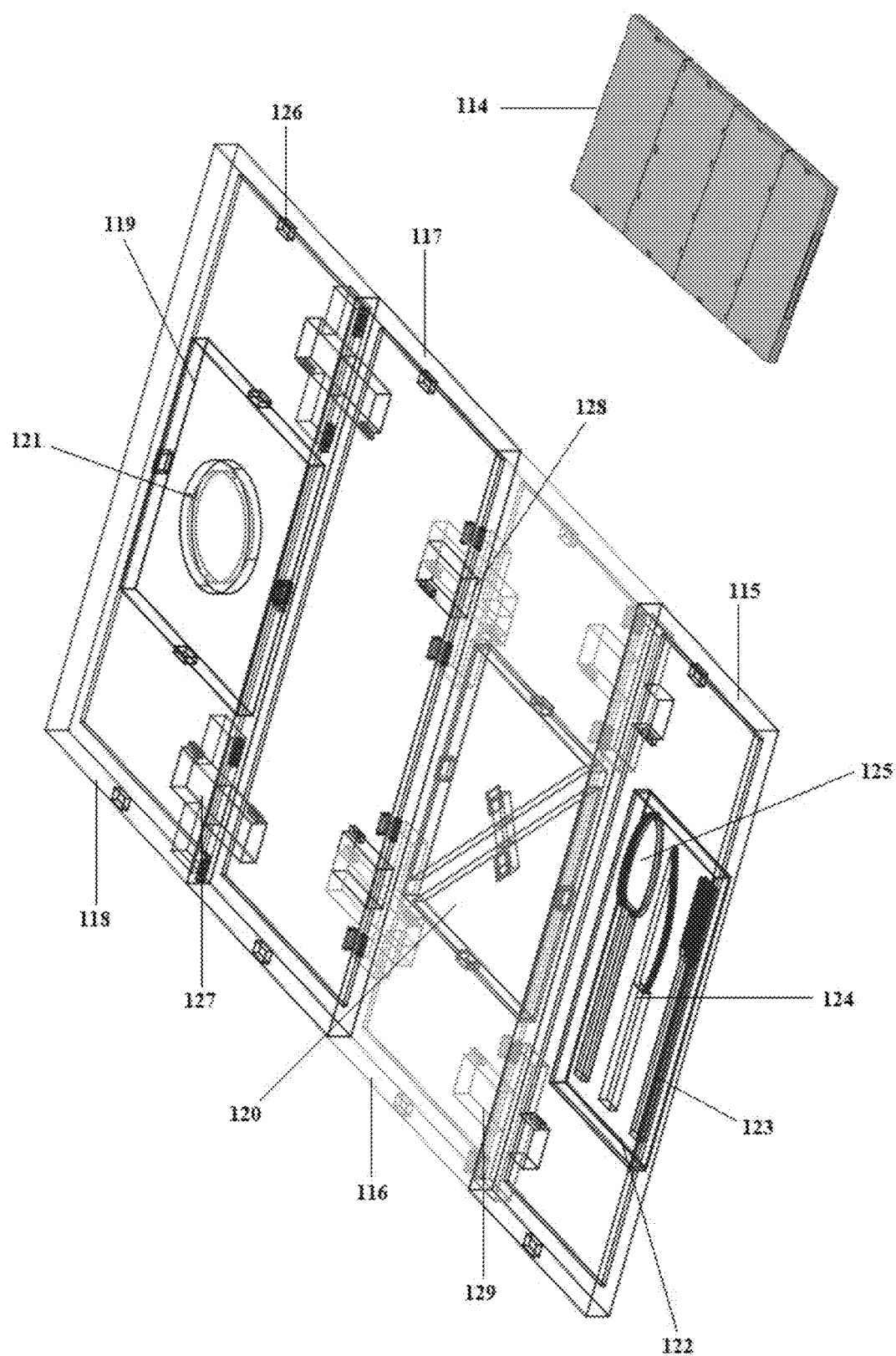
FIG. 18 is a perspective view of a plate solution embodiment to present the main goal to use each special grips

FIG. 18: The plate mode (114) will be a merge of the different individual plates (115, 116, 117 & 118), the identifier of the product will be on piece that contain main board with hips (119), and the chip will be protected with PI standards (121). One of the individual plates will have a cutlery storage bucket (122) that will include a fork (123), knife (124) and a spoon (125). The plates will have security holes (126) and the keep a rigid form and keep security, the plates will have internal areas for place the staples as solid base (127, 128 & 129). One of the individual plates will store the closure module (120).

Figure 19:
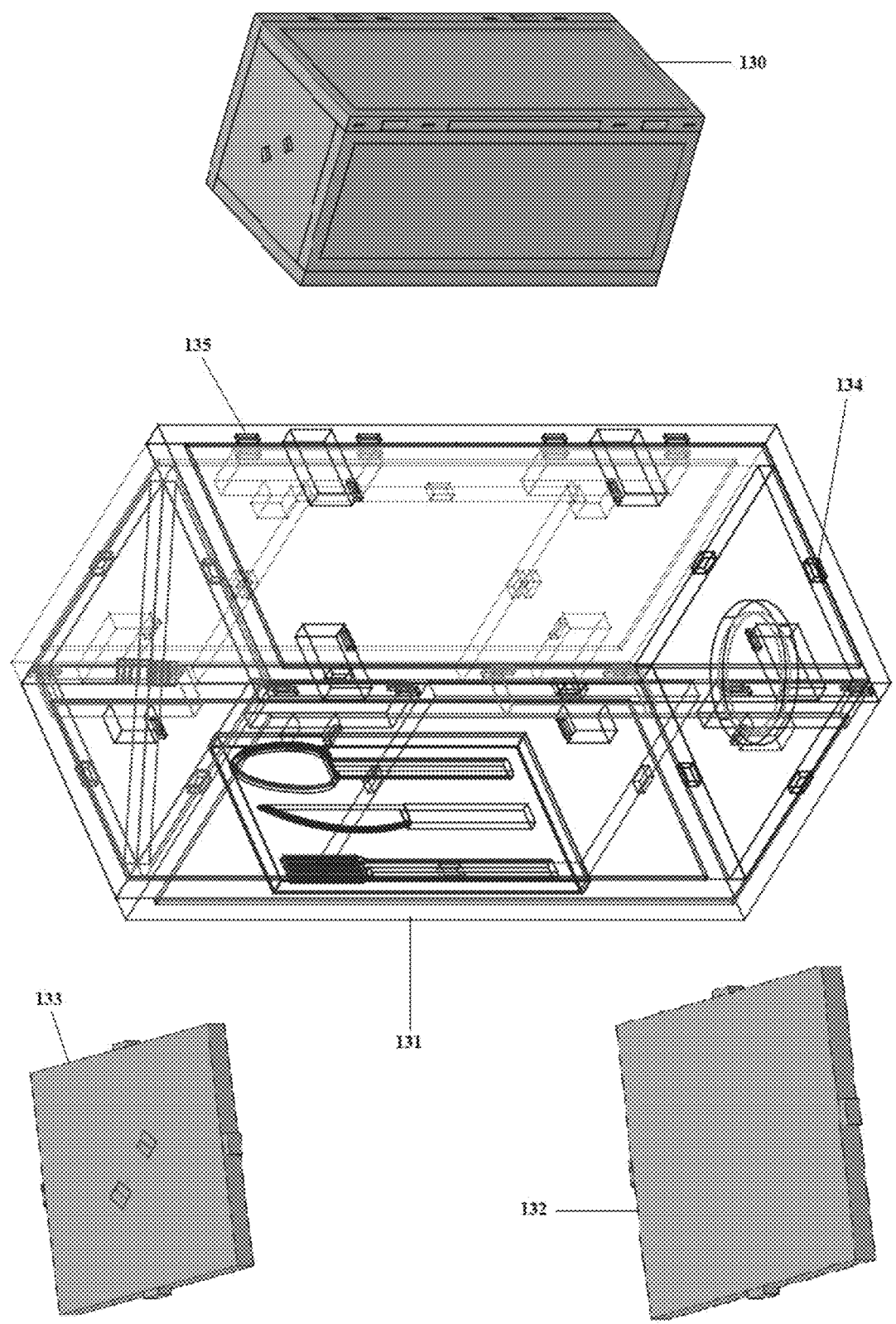
FIG. 19 is a perspective view of a plate on cube mode to show the grips and sections used to generate this features

FIG. 19: The plate in the cube form that will fit all individual plates (130), the utility device will have a locked based on magnetic materials (131), the plate that include the main chip board with NFC & BLE has ingress protection) features, IP (132), the piece with locker features (133) can make the cube into a snack box. The cube will have security holes (134) for staples (135) and to secure bottom and top pieces.

Figure 20:
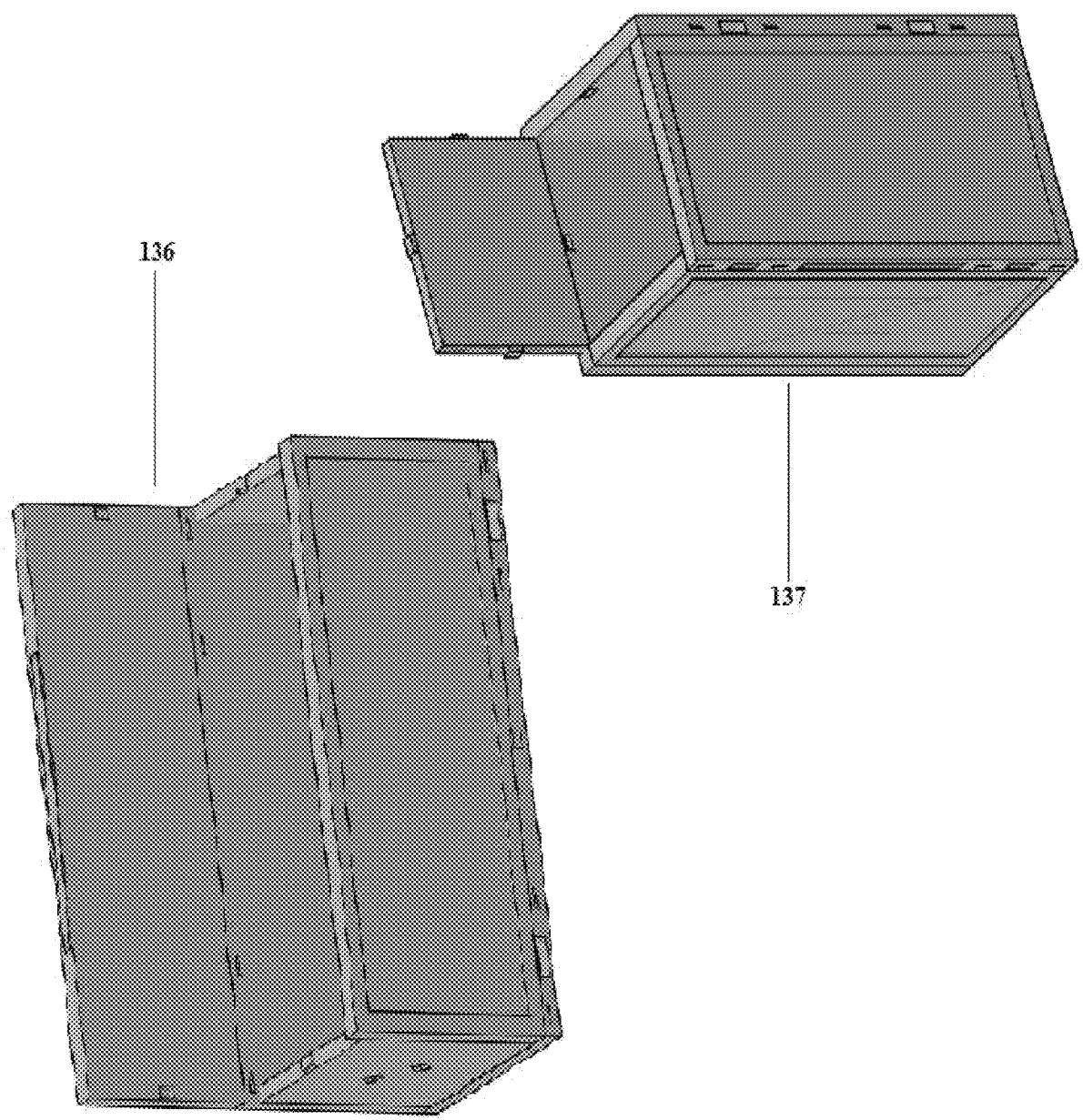
FIG. 20 is a perspective view of different usage of plate under cube mode to generate a box and be able to use it as snack box and or bag to use on fast food service.

FIG. 20: The plates have a modular feature to be used as snack box (136) or food storage for fast food and avoid disposable bags (137).

Figure 21:
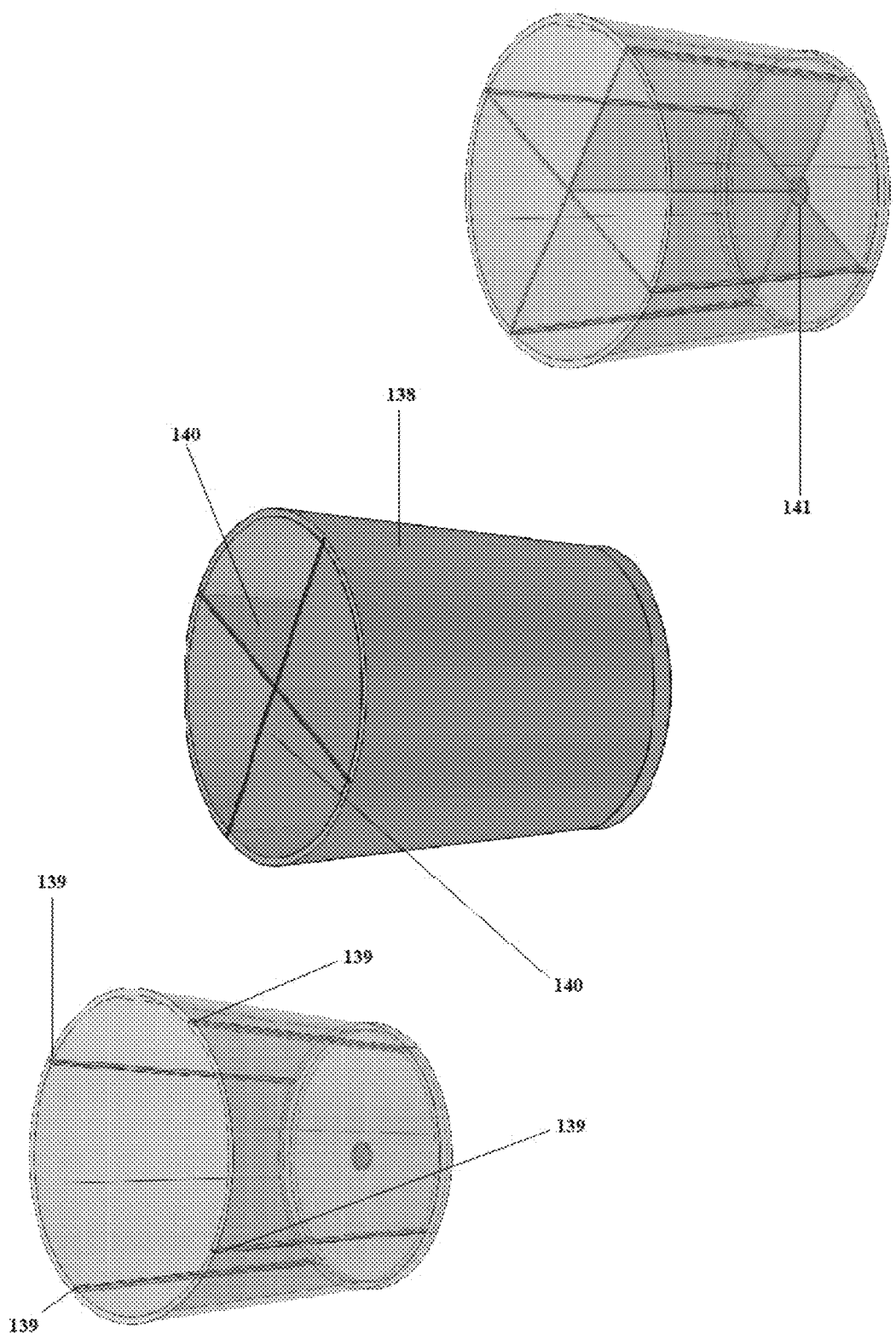
FIG. 21 is a perspective view of a modular bucket that includes a main body, internal slits and an embedded NFC & BLE chip.

FIG. 21: Modular bucket that includes a main body (138) and internal slits (139) to insert splitter walls (140) and an embedded NFC & BLE chip (141).

Figure 22:
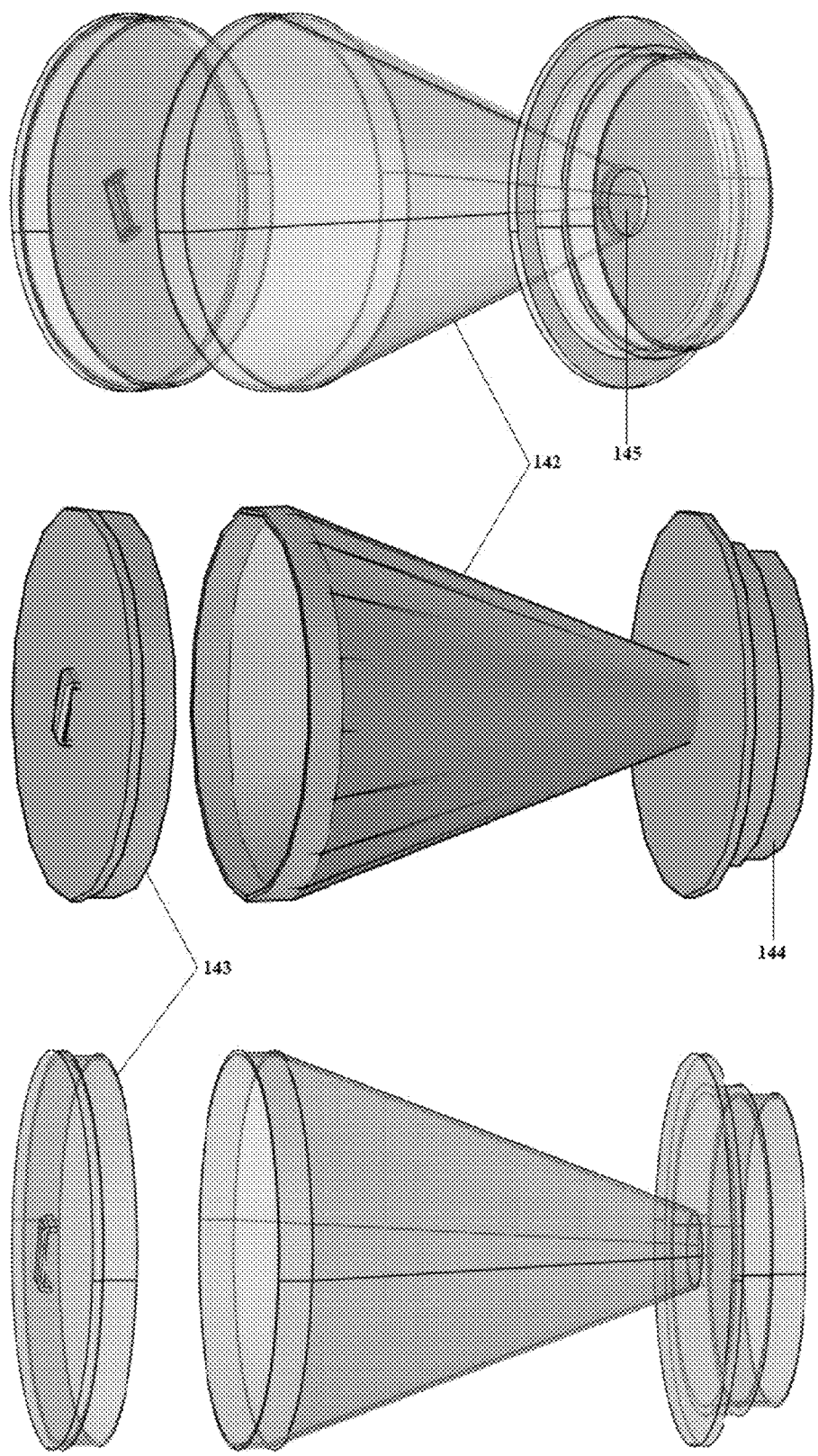
FIG. 22 is a perspective view of an additional cap available for tumblers. The cap will merge a module for coffee pour over.

FIG. 22: This is an additional cap available for tumblers. The cap will merge a module for coffee pour over method that include main body to insert coffer grain (142), a module cap (143), the pressure cap's sealed closure (144) and the liquid release area with filter (145).

Figure 23:
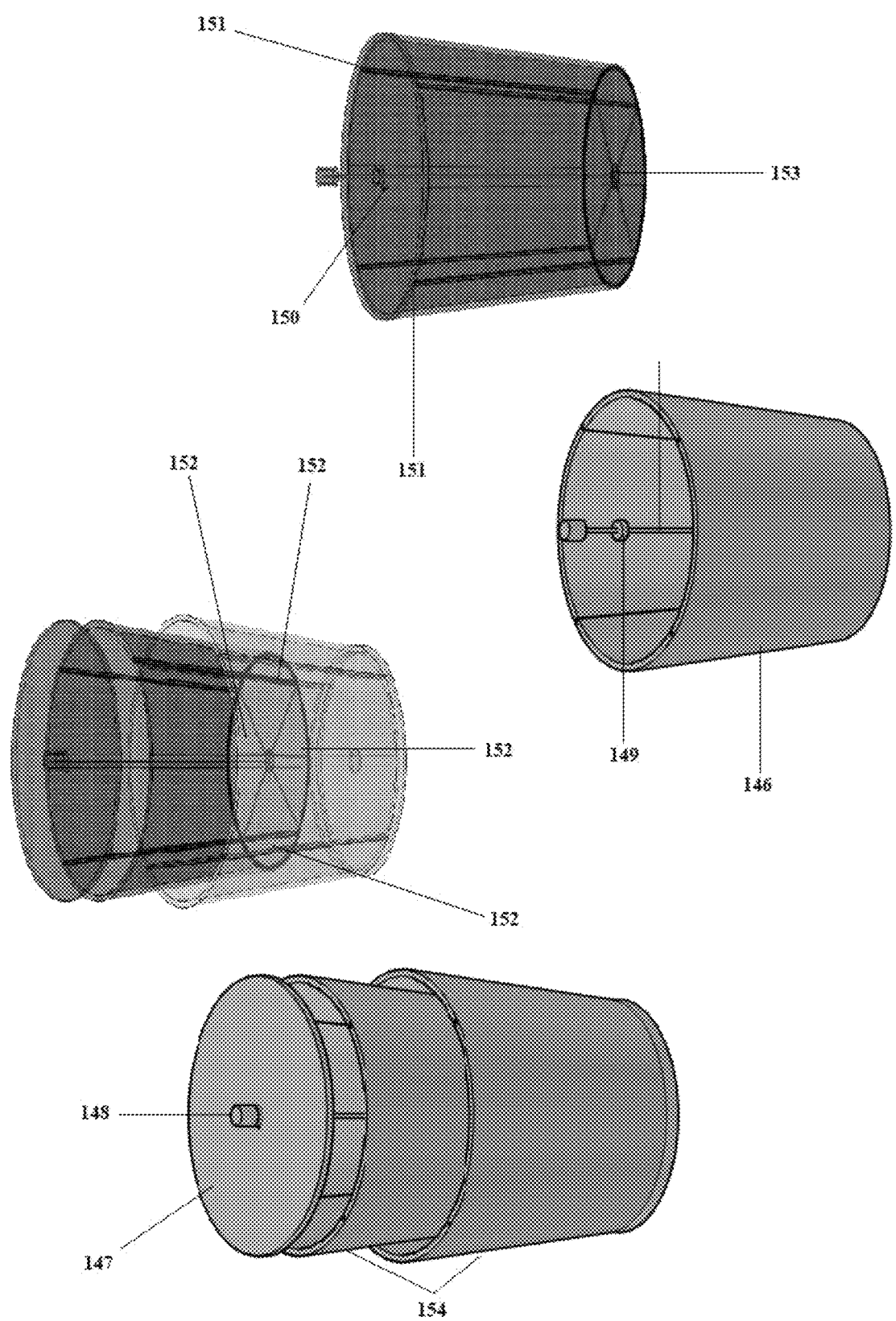
FIG. 23 is a perspective view of a delivery bucket for food service franchises/companies that will work to exchange products to a modular bucket.

FIG. 23: Delivery bucket that will work to exchange products to a modular bucket (154). This will be a few smaller than regular modular bucket and include a main body (146) a locker (149) to close bucket with cap (147) a cap stopper (148) to avoid its fails during product exchange, air breather (150), slits for splitter walls option (151), collapsible bottom and released as gates (152) when you remove locker and push down a plunger rod (155), the NFC & BLE chip is included on the bottom gates' holder (153).

Figure 24:
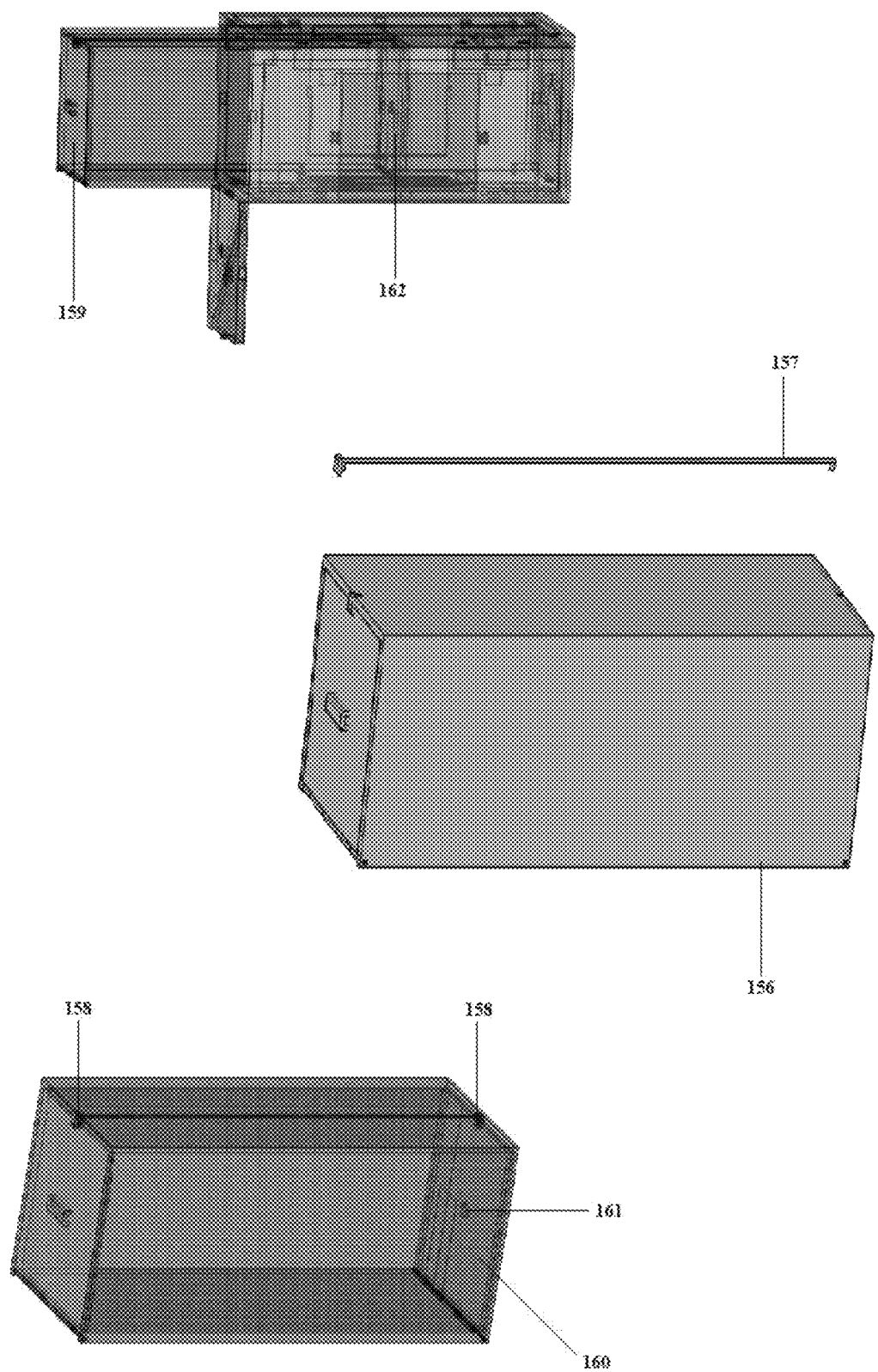
FIG. 24 is a perspective view of a delivery box for food service franchises/companies that will work to exchange product using modular plates.

FIG. 24: Delivery box that will work to exchange product using modular plates (162), include a main body (156), a secure lock metal rod (157), special locker (158) entrance on the top cover (159) and bottom cover (160). The bottom cover is collapsible when secure metal rod is turned to a release side and include the NFC & BLE chip (161)

Figure 25:
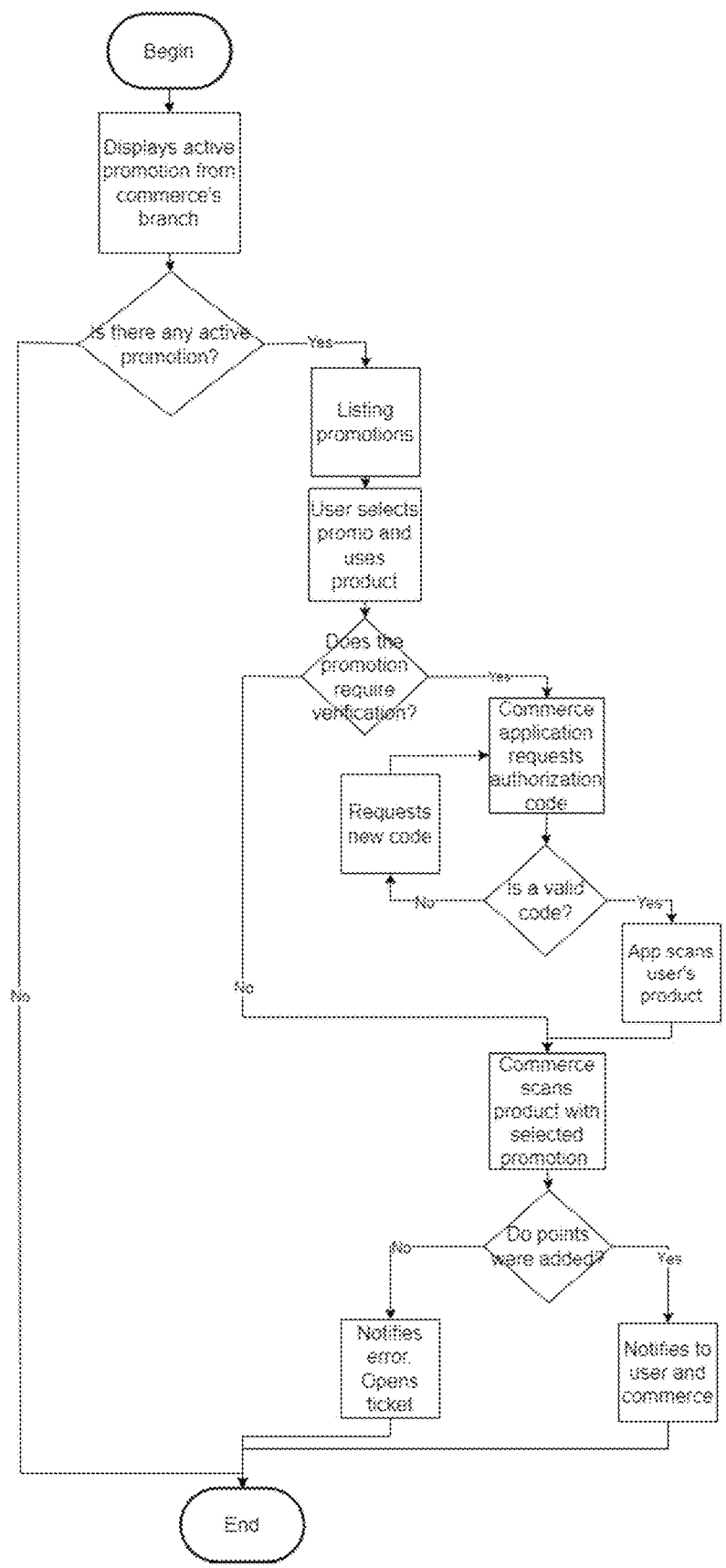
FIG. 25 is a chart showing a registration process to be used in the mobile applications and web services.

FIG. 25: Points registration process. The process starts when a business account/food franchise start to add promotions to receive/redeem rewards. If promotions from any business account are already active on the system, they will be able to be displayed on the web tool/mobile app, the invention's product owners will be able to select the promotion. On promotions that are created to use just invention trademark's products, a verification will be required to receive the reward just to franchise products. To gain Point on a promotion, a product's NFC scan is needed to complete successfully to apply additional points/rewards.

Figure 26:
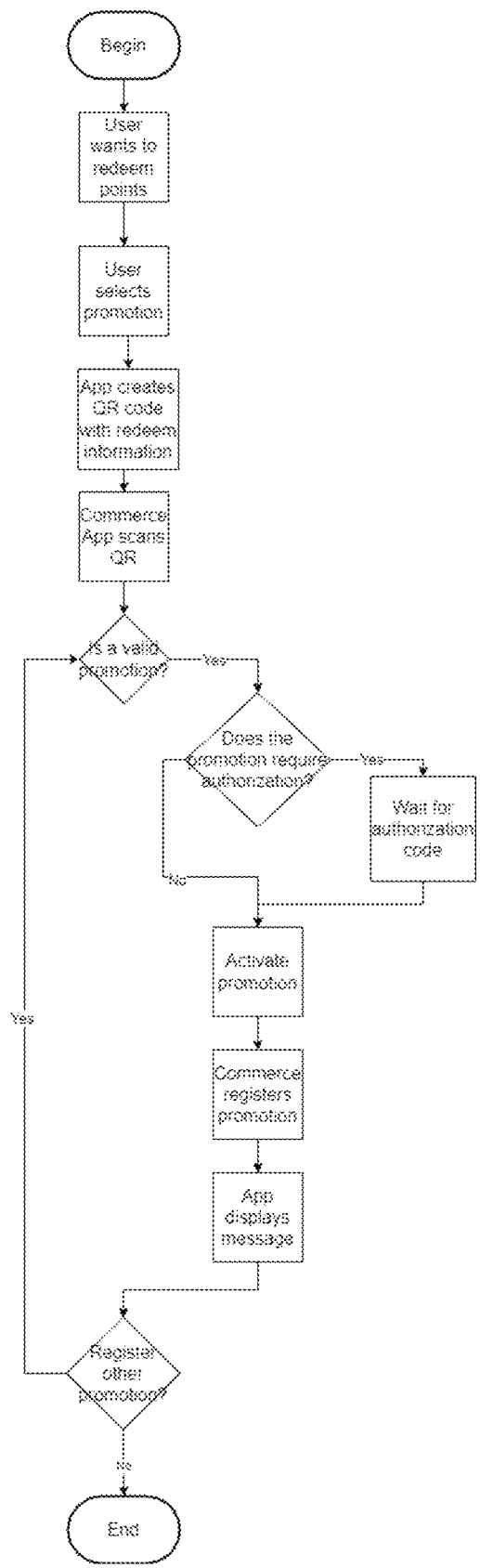
FIG. 26 is a chart showing a points redeeming process to be used in the mobile applications and web services.

FIG. 26: Points redeem process. Based on promotions available by business accounts, invention's product owners are going to be able to select a promotion and mobile app will generate a code to be scan to redeem points from user point's wallet. To redeem points could be using special points granted by business accounts on their branches or could be redeems using proprietary company points' wallet. User can repeat this process based on points available and business accounts parameters.

Figure 27:
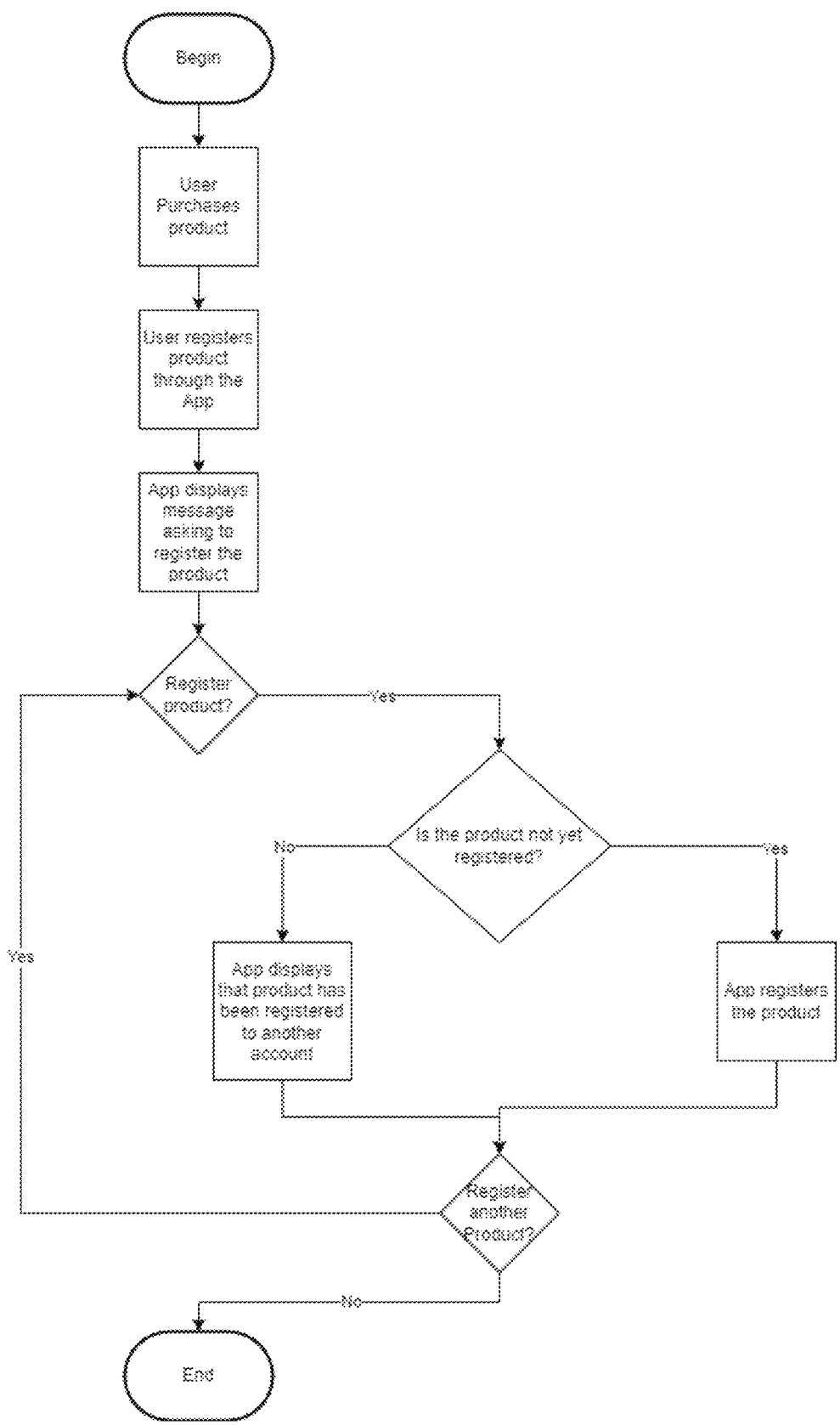
FIG. 27 is a chart showing a process to be used in the mobile applications and web services.

FIG. 27: New product process. When user acquired a new product, the first step is to register the invention's product on the web tool or mobile app, there will be a section register and monitor available products. The system will verify I there is no other user with the same product ID registered on the system to be able to complete the process. The user can add multiple product and be able to manage them on the web tool and mobile app.

Figure 28:
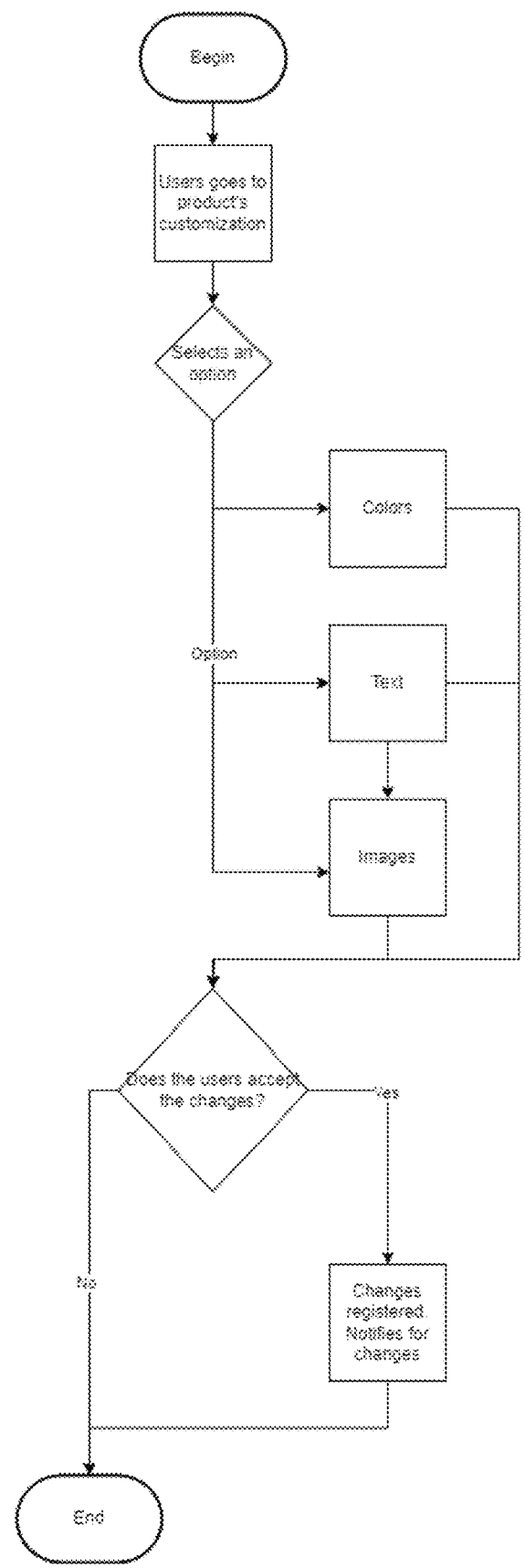
FIG. 28 is a chart showing a product customization to be used in the mobile applications and web services.

FIG. 28: Product Customization. Once user have a product included on the system, the web tool and mobile app have a feature to select different type of accessories to customize your invention product to increase ties. The accessories can be selected and visualized on their product on different colors and customization change can be stored to plan accessories purchase.

Figure 29:
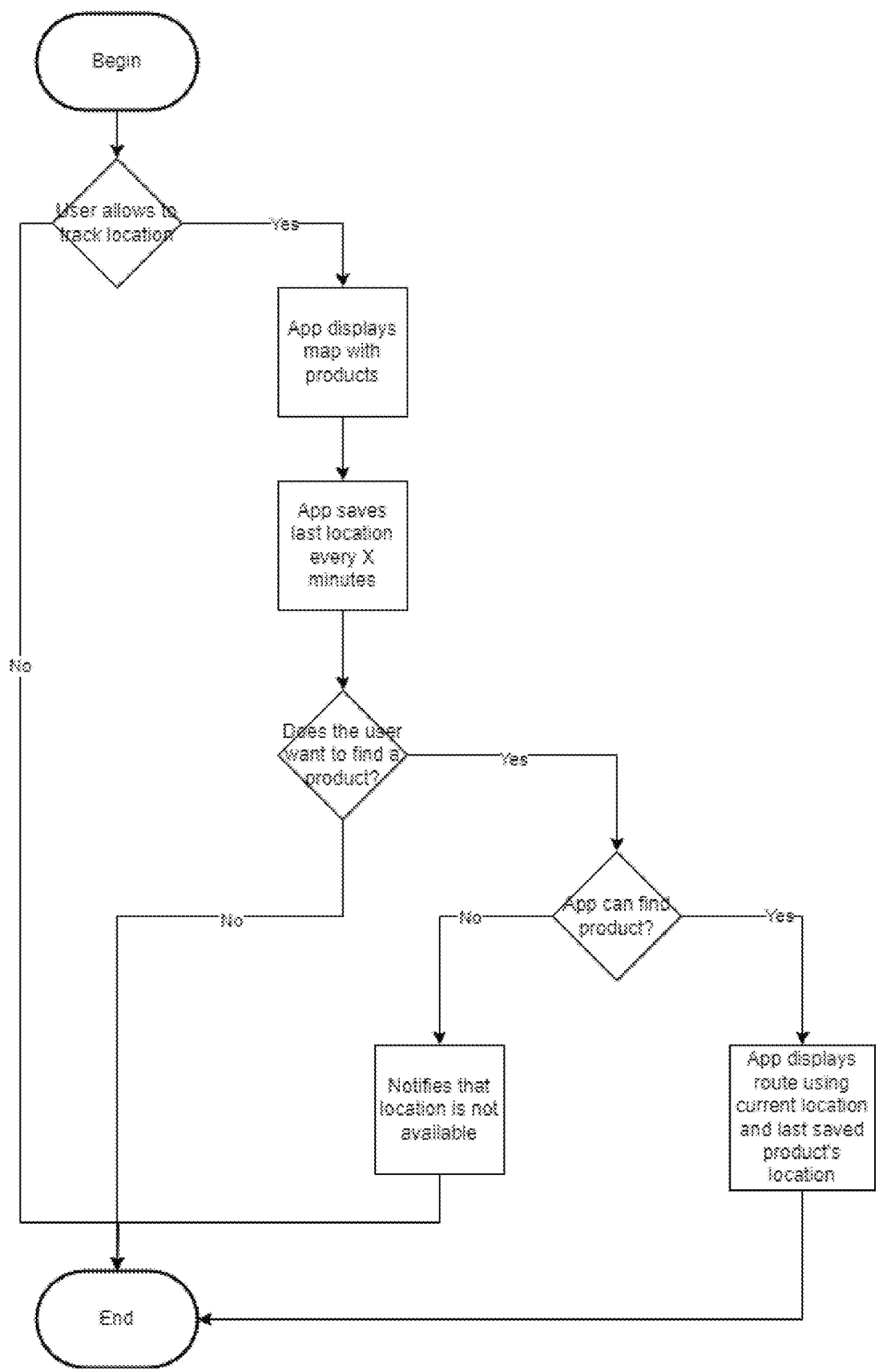
FIG. 29 is a chart showing a product location process to be used in the mobile applications and web services.

FIG. 29: Product location. When registering a product, the invention's product owners will be able to approve the usage of GPS to assist on locate a product from other user using the BLE chip, the users are going to be able to see and track only products registered on their profiles but if user approves, application will be able to search for near devices. A map will be available on the wen tool and application to locate product and location will be stored after x time. If users want to find the product, they can use last location or use live search function using smart devices GPS system. If product is not found, a message will be presented to user.

Figure 30:
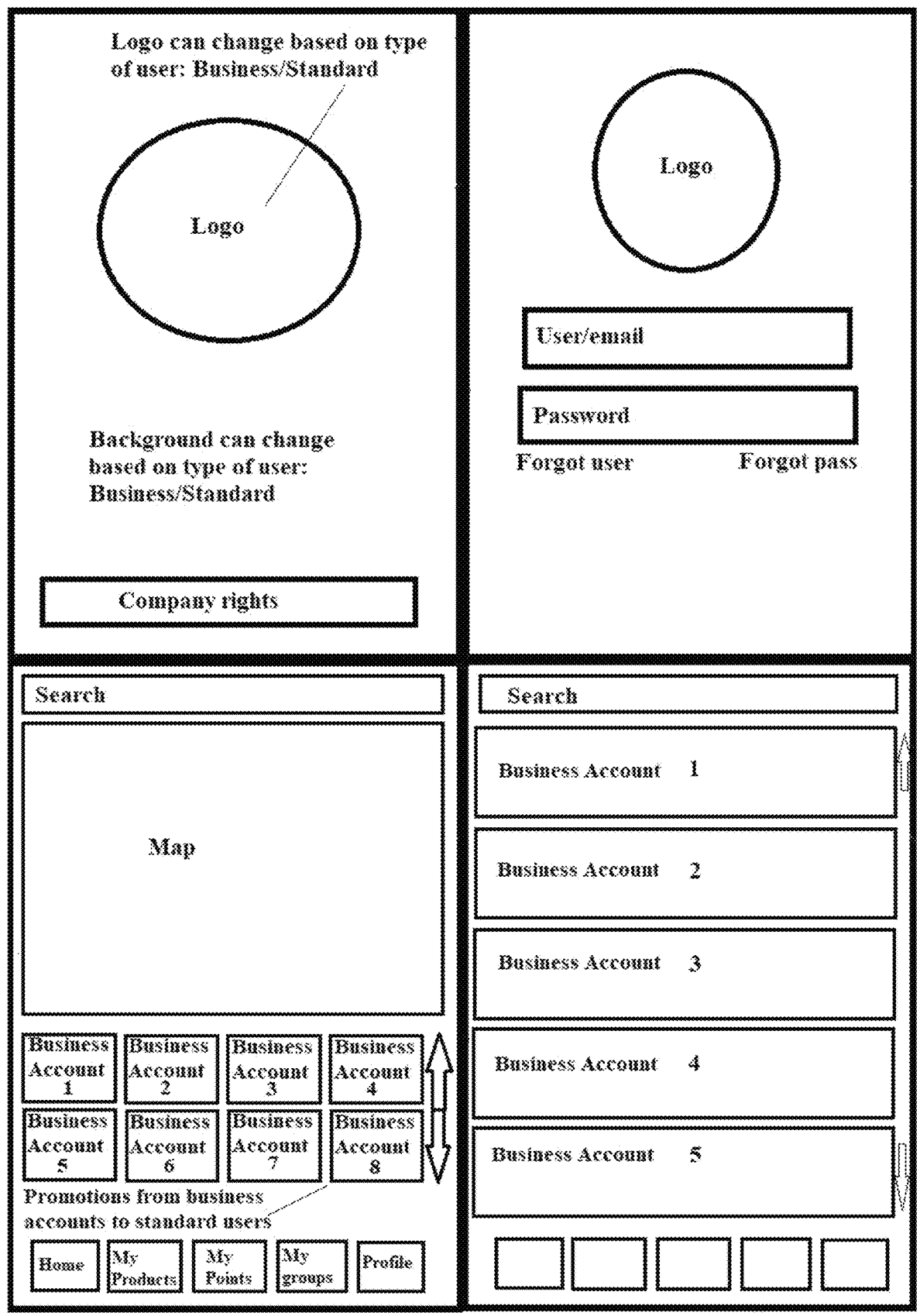
FIG. 30 is an example of mobile app displays.

FIG. 30: Mobile app displays. Example of the multi-language feature, login windows, main map to locate business accounts/food franchises near to user's location, a display of search base of type of account business/food franchise.

FIG. 31: Mobile app displays. Example of business account promotions a rewards schema, A display or Rewards wallet overview, a display to manage registered product, and display on search product on map.

An important version of the invention can be fairly described as a foodservice container comprising a container with an exchangeable section, wherein a near field communication chip (NFC) and a Bluetooth™ low energy beacon (BLE) are inside the exchangeable section, such as an additional bottom container. The exchangeable section provides an ingress protection standard (IP) and protects the NFC and BLE from shock and thermal damage during normal use of the device. The exchangeable section is removable and openable only with a preselected key or specific tool to prevent the consumer from unauthorized access to the electrical components. Optionally, the foodservice container may be further characterized in that the container is any of a tumbler, a vessel, a bucket, a plate, a delivery box or any other food container to take prepared food out from a food provider. Optionally, the exchangeable section also contains an accelerometer, a temperature reader or other complementary electronic components. Optionally, a removable lid is provided to protect the contents of the container. Optionally, the lid is provided that has an attachment point to connect to an accessory, such as a lanyard, strap, handle, clip or other accessory. Optionally, the lid includes a French press. Optionally, the lid includes a variable length infuser. Optionally, the lid includes a coffee pour over module. Optionally, the lid includes a slider to cover a food in the container to further protect the food in the container from contamination yet allow easy access to the food when needed. Optionally, a top of the container has threads to affix a lid. Optionally, container is a delivery box or bucket that has a collapsible bottom area and a plunger rod that keeps the collapsible bottom open when the container is in use that essentially keeps the interior of the container open when in use to avoid crushing the food by avoiding container collapse during use. The invention can also be fairly described as a process of using the foodservice container described herein by, among other steps, providing the foodservice container. And, establishing a unique user account associated for an owner of the foodservice container. Also, providing a vendor with hardware and internet based software to receive an identification data from the NFC and BLE in the container. And, the vendor receiving the identification data and associating the identification data with a location of the vendor and recording a visit data with the internet based software establishing that the specific foodservice container was physically at the location of the vendor. Then, providing the user a benefit for moving the foodservice container to the location of the vendor. Optionally, the user is provided a vendor location information to assist in locating a nearby vendor that uses the system. Optionally, an immediate financial discount or reward for a future purchase from the vendor is delivered to the customer. Another important version of the invention can be fairly described as a process to locate a food service container, such as any of those disclosed herein, comprising providing a food service container having an embedded BLE chip that connects through an internet network to an application to track and record a location of the foodservice container. And, the application uses a mobile device GPS feature to determine a georeferenced foodservice container location. Also, the application generates a map to locate the food service container. Optionally, the device includes a modular holder that comprises a main base that secures a holder that stores a sectional straw and can include a multipurpose clip hook and a hook that attaches to the a main base to hold food container, and where the hook is used solely with a key ring. Optionally, the container is a cupholder comprising a hook to secure to the container and has an internal storage area to store a sectional straw. Optionally, service container of claim 1 further wherein the container is a delivery box that has an internal storage area that contains multiple of the smaller containers described herein to transport several container together in a safe and secure condition.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

The invention claimed is:

1. A foodservice container comprising a container with an exchangeable section wherein:
    a near field communication chip (NFC) and a Bluetooth™ low energy beacon (BLE) are inside the exchangeable section;
    the exchangeable section provides an ingress protection standard (IP) and protects the NFC and BLE from shock and thermal damage;
    the exchangeable section is removable and openable only with a preselected key.

2. The foodservice container of claim 1 further characterized in that the container is any of a tumbler, a vessel, a bucket, a plate or a delivery box.

3. The foodservice container of claim 2 further characterized in that the exchangeable section also contains an accelerometer and temperature reader.

4. The foodservice container of claim 2 further characterized in that a removable lid is provided to protect the contents of the container.

5. The foodservice container of claim 2 further characterized in that a lid is provided that has an attachment point to connect to an accessory.

6. The foodservice container of claim 5 further characterized in that the lid includes a French press.

7. The foodservice container of claim 5 further characterized in that the lid includes a variable length infuser.

8. The foodservice container of claim 5 further characterized in that the lid includes a coffee pour over module.

9. The foodservice container of claim 5 further characterized in that the lid includes a coffee pour over module.

10. The foodservice container of claim 5 further characterized in that the lid includes a slider to cover a food in the container.

11. The foodservice container of claim 2 further characterized in that a top of the container has threads to affix a lid.

12. The foodservice container of claim 1 further characterized in that the container is a delivery box or bucket that has a collapsible bottom area and a plunger rod that keeps the collapsible bottom open when the container is in use.

13. A process of using the foodservice container of claim 1 comprising:
    providing the foodservice container;
    establishing a unique user account associated for an owner of the foodservice container;
    providing a vendor with hardware and internet based software to receive an identification data from the NFC and BLE;
    the vendor receiving the identification data and associating the identification data with a location of the vendor and recording a visit data with the internet based software establishing that the specific foodservice container was physically at the location of the vendor;
    providing the user a benefit for moving the foodservice container to the location of the vendor.

14. The process of claim 13 further characterized in that the user is provided a vendor location information to assist in locating a nearby vendor.

15. The process of claim 13 wherein the benefit is an immediate financial discount or reward for a future purchase from the vendor.

16. A process to locate a food service container of claim 1 comprising:

providing a food service container having an embedded BLE chip that connects through an internet network to an application to track and record a location of the foodservice container;

the application uses a mobile device GPS feature to determine a georeferenced foodservice container location;

the application generates a map to locate the food service container.

17. The food service container of claim 5 further including a modular holder that comprises:

a main base that secures a holder that stores a sectional straw and can include a multipurpose clip hook;

a hook that attaches to the a main base to hold food container;

the hook is used solely with a key ring.

18. The foodservice container of claim 5, wherein the container is a cupholder comprising a hook to secure to the container and has an internal storage area to store a sectional straw.

19. The foodservice container of claim 1 further wherein the container is a delivery box that has an internal storage area that contains multiple plates.

* * * * *